US012810012B1

(12) United States Patent
Berg et al.

(10) Patent No.: US 12,810,012 B1
(45) Date of Patent: Nov. 24, 2026

(54) APPARATUS FOR AND METHOD OF LICENSE-GATED, REAL-TIME DATA ORCHESTRATION AND UNIFIED REPRESENTATION

(71) Applicant: Redirect Health, Inc., Phoenix, AZ (US)

(72) Inventors: David F. Berg, Phoenix, AZ (US); Lior Weinstein, Austin, TX (US)

(73) Assignee: Redirect Health, Inc., Phoenix, AZ (US)

( * ) Notice: Subject to any disclaimer, the term of this patent is extended or adjusted under 35 U.S.C. 154(b) by 0 days.

(21) Appl. No.: 19/570,363

(22) Filed: Mar. 18, 2026

(51) Int. Cl.

| | |
|---|---|
| ***G06F 21/00*** | (2013.01) |
| ***G06F 21/62*** | (2013.01) |
| ***G06N 20/00*** | (2019.01) |

(52) U.S. Cl.
CPC ......... *G06F 21/6218* (2013.01); *G06N 20/00* (2019.01)

(58) Field of Classification Search
CPC ............................ G06F 21/6218; G06N 20/00
See application file for complete search history.

(56) References Cited

U.S. PATENT DOCUMENTS

| | | | | |
|---|---|---|---|---|
| 11,693,990 | B1 | 7/2023 | Arkoff et al. | |
| 12,333,610 | B1 * | 6/2025 | Berg ...................... | G06Q 10/10 |
| 2014/0136237 | A1 | 5/2014 | Anderson et al. | |
| 2018/0234460 | A1 * | 8/2018 | Smith ................. | G06F 21/6218 |
| 2019/0236173 | A1 * | 8/2019 | Ghatage .................. | G06F 16/22 |
| 2023/0222360 | A1 * | 7/2023 | Liu ........................ | G06N 5/022 706/12 |
| 2024/0249182 | A1 * | 7/2024 | Kirshenboim ......... | G06N 3/096 |
| 2025/0094406 | A1 * | 3/2025 | Martinez Fonte .. | G06F 16/2365 |

FOREIGN PATENT DOCUMENTS

| | | |
|---|---|---|
| WO | 2023069467 A1 | 4/2023 |

* cited by examiner

*Primary Examiner* — Ka Shan Choy
(74) *Attorney, Agent, or Firm* — CALDWELL LLC

(57) ABSTRACT

License-gated, real-time data orchestration and unified representation is achieved by receiving data signals from operational environments, determining an access context for each signal, and executing an ingestion pathway based on the access context. The ingestion pathway establishes a constrained data session with permissible data sources, enforces access constraints, acquires source data, and blocks non-permissible data sources. The source data is then transformed into data objects and unified into a data structure. This process ensures secure and controlled data ingestion, reducing latency and improving data integrity. The unified data structure enables integrated representation of data from different access contexts, enhancing data analysis and utilization.

33 Claims, 8 Drawing Sheets

APPARATUS FOR AND METHOD OF LICENSE-GATED, REAL-TIME DATA ORCHESTRATION AND UNIFIED REPRESENTATION

FIELD OF THE INVENTION

The present invention generally relates to the field of data ingestion and unification. In particular, the present invention is directed to an apparatus for and method of license-gated, real-time data orchestration and unified representation.

BACKGROUND

Modern data processing systems increasingly operate across heterogeneous data environments. The field of data governance has seen significant growth in recent years, with various approaches being developed to manage and control access to sensitive data. Existing governance approaches often rely on static access matrices; this creates a single point of failure that can render access control system inoperable due to slight changes in distributed environments that are beyond the access control systems' control.

SUMMARY OF THE DISCLOSURE

In some aspects, the techniques described herein relate to an apparatus for of license-gated, real-time data orchestration and unified representation. The apparatus includes at least a processor, and a memory communicatively connected to the at least a processor, wherein the memory contains instructions configuring the at least a processor to receive a plurality of data signals from a plurality of operational environments in real time, determine, at runtime, an access context for each data signal, wherein each access context is associated with one or more permissible data sources and one or more access constraints, select and execute, for each data signal, an ingestion pathway as a function of the access context, wherein executing the ingestion pathway includes establishing a constrained data session with the one or more permissible data sources associated with the access context, wherein establishing the constrained data session includes enforcing the one or more access constraints during the constrained data session, acquiring, using the constrained data session, source data from the one or more permissible data sources, and blocking acquisition of data from non-permissible data sources, and generate a data structure including the source data, wherein generating the data structure includes transforming the source data into one or more data objects, and unifying the one or more data objects generated under different access contexts into the data structure.

In some aspects, the techniques described herein relate to a method of license-gated, real-time data orchestration and unified representation. The method includes receiving, using at least a processor, a plurality of data signals from a plurality of operational environments in real time, determining, using the at least a processor and at runtime, an access context for each data signal, wherein each access context is associated with one or more permissible data sources and one or more access constraints, selecting and executing, using the at least a processor and for each data signal, an ingestion pathway as a function of the access context, wherein executing the ingestion pathway includes establishing a constrained data session with the one or more permissible data sources associated with the access context, wherein establishing the constrained data session includes enforcing the one or more access constraints during the constrained data session, acquiring, using the constrained data session, source data from the one or more permissible data sources, and blocking acquisition of data from non-permissible data sources, and generating, using the at least a processor, a data structure including the source data, wherein generating the data structure includes transforming the source data into one or more data objects, and unifying the one or more data objects generated under different access contexts into the data structure.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
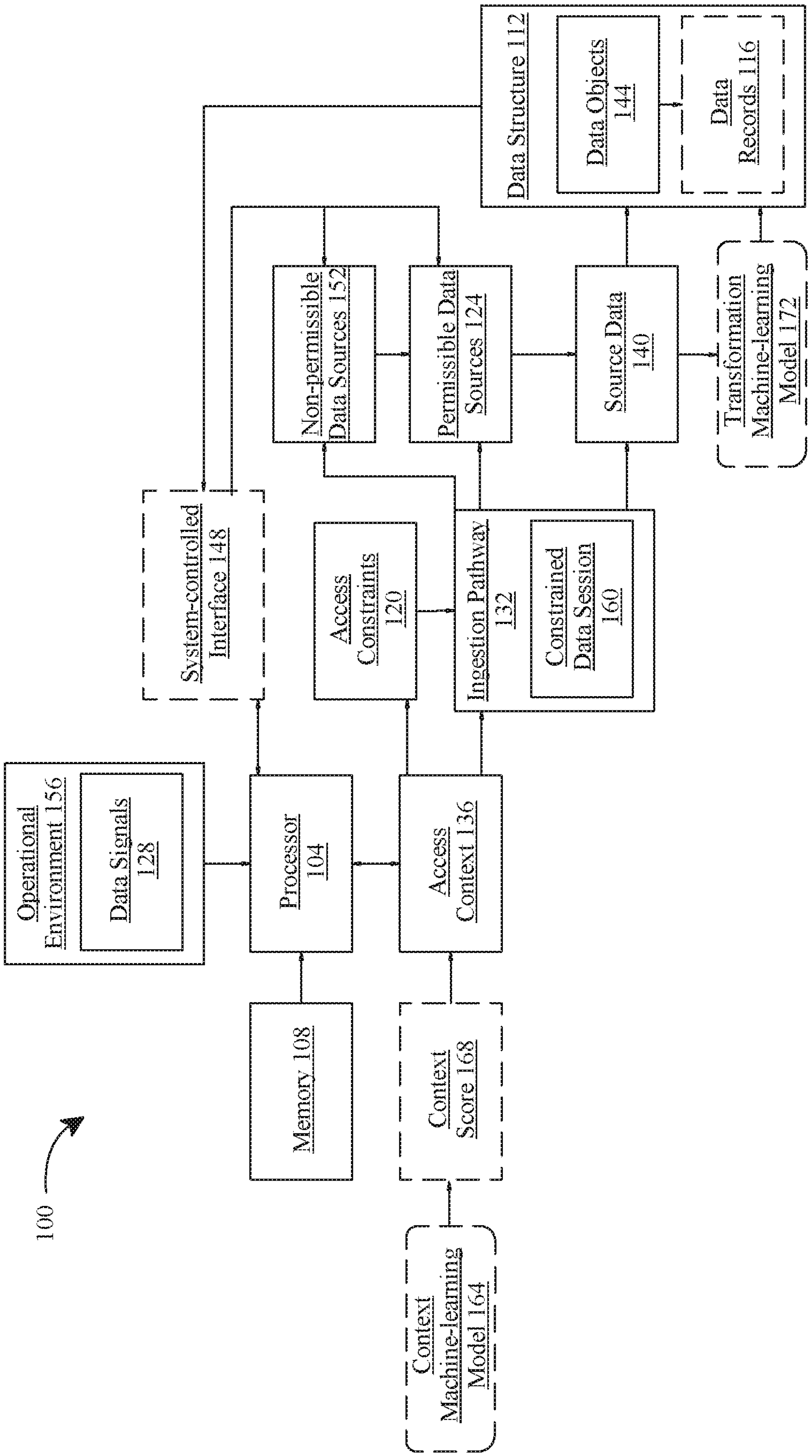
FIG. 1 illustrates a block diagram of an exemplary apparatus for license-gated, real-time data orchestration and unified representation.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Aspects of the present disclosure integrate and leverage medical, broker, third-party administrator (TPA), pharmacy benefit manager (PBM), and pharmacy licenses and capabilities across all 50 states, and proprietary data streams from internal systems and crowdsourcing platforms, to capture end-to-end clinical, prescription, financial, and real-world member-generated data.

Embodiments disclosed herein can be used to acquire heterogeneous healthcare data streams under multiple, distinct license-linked permissions and integrate such data streams into a unified data layer spanning clinical, financial, and interaction domains. Aspects of the present disclosure can also be used to dynamically determine, at runtime, which license-linked context authorizes access to a given data stream and to route ingestion accordingly in compliance with timing privileges, permissible data sources, and handling rules associated with each license. This is so, at least in part, because the disclosed architecture includes a license-context resolution layer that associates each incoming data signal with a valid access context and executes a corresponding ingestion pathway that enforces license-specific constraints while preserving real-time availability of acquired data.

The present disclosure further describes embodiments that allow for real-time, license-gated access to care-relevant and member-generated data at or near the time of care, prescription, discharge, or member interaction, including behavioral context, decision drivers, financial stress indicators, care intent, and real-world outcomes that are not present in traditional electronic health record or claims datasets. The disclosed system may structure and enrich such data using machine-learning models and link resulting structured data objects to clinical and financial records to generate a continuously updated member-level representation. By dynamically resolving license permissions and controlling ingestion pathways across multiple operational domains, the disclosed architecture may reduce latency relative to claims-based systems, prevent unauthorized access to restricted data streams, and improve technical operation of healthcare data processing systems through unified, constraint-aware, real-time data integration.

Aspects of the present disclosure are directed to apparatuses for and methods of license-gated, real-time data orchestration and unified representation. The apparatus includes at least a processor, and a memory communicatively connected to the at least a processor, wherein the memory contains instructions configuring the at least a processor to receive a plurality of data signals from a plurality of operational environments in real time, determine, at runtime, an access context for each data signal, wherein each access context is associated with one or more permissible data sources and one or more access constraints, select and execute, for each data signal, an ingestion pathway as a function of the access context, wherein executing the ingestion pathway includes establishing a constrained data session with the one or more permissible data sources associated with the access context, wherein establishing the constrained data session includes enforcing the one or more access constraints during the constrained data session, acquiring, using the constrained data session, source data from the one or more permissible data sources, and blocking acquisition of data from non-permissible data sources, and generate a data structure including the source data, wherein generating the data structure includes transforming the source data into one or more data objects, and unifying the one or more data objects generated under different access contexts into the data structure.

In some embodiments, the disclosed architecture may solve the foregoing problem by replacing static access matrices with a dynamically evaluated access context framework executed at runtime by a processor. Rather than relying on a centrally defined, precomputed permission table that assumes fixed environmental conditions, the processor may determine an access context for each incoming data signal based on real-time attributes, environmental metadata, and constraint definitions stored in memory. The processor may then establish a constrained data session in which executable access constraints are enforced at multiple layers, including query validation, response filtering, session state monitoring, and threshold enforcement. Because access permissions are resolved dynamically and enforced through executable session-level controls rather than static matrix lookups, the system may remain operational even when distributed environments change, such as when endpoints are updated, schemas evolve, or operational roles shift. In some embodiments, constraint definitions may be stored as modular policy objects and evaluated per session, thereby eliminating reliance on a single centralized access matrix and reducing the likelihood that minor configuration drift or distributed changes render the access control system inoperable.

Exemplary embodiments illustrating aspects of the present disclosure are described below in the context of several specific examples.

Referring now to FIG. 1, an exemplary embodiment of apparatus 100 for license-gated, real-time data orchestration and unified representation is illustrated. In an embodiment, a computing system may be configured to implement a license-linked data capture architecture that ingests, normalizes, and unifies data streams that are legally accessible only through specific combinations of healthcare licenses across medical, brokerage, third-party administrator (TPA), pharmacy benefit management (PBM), and pharmacy operational environments. In some embodiments, the apparatus 100 described herein may represent an exemplary embodiment of one particular implementation or use case of the disclosed architecture and is not intended to limit the scope of alternative configurations, environments, or applications of the apparatus 100.

Apparatus 100 may include circuitry such as without limitation a processor 104 communicatively connected to a memory 108; for instance, circuitry may include and/or be included in a computing device. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, memory 108 may include a primary memory and a secondary memory. For the purposes of this disclosure, "memory" is a non-transitory machine-readable storage medium configured to store executable instructions and data. The memory 108 may include volatile memory components for runtime execution and non-volatile storage components for persistent storage of the data structure 112 and data records 116. In some embodiments, the memory 108 may store policy definitions corresponding to access constraints 120, mapping structures corresponding to permissible data sources 124, and schema definitions corresponding to the data structure 112. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 104 may access the information from primary memory.

With continued reference to FIG. 1, as used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. In some embodiments, the apparatus 100 may be deployed within a distributed computing environment, and the processor 104 may execute instructions across multiple computational nodes. The processor 104 may include one or more central processing units, graphical processing units, tensor processing units, or other computational engines capable of performing arithmetic, logical, and machine-learning operations. In some embodiments, the processor 104 may include multiple cores configured to concurrently process multiple data signals 128. The processor 104 may implement multithreaded execution to handle parallel ingestion pathways 132 associated with different access contexts 136.

With continued reference to FIG. 1, in some embodiments, a processor 104 may be configured to perform real-time, license-aware data ingestion across a plurality of healthcare operational domains by dynamically resolving access permissions at runtime and routing data acquisition accordingly. The processor 104 may include or cooperate with a license-context resolution layer that may determine, for each incoming data signal 128 or interaction event, a valid access context 136 from among a plurality of license-linked contexts, wherein each license-linked context may be associated with distinct permissible data sources 124, timing constraints, and handling rules. In some embodiments, based on the determined license-linked context, the processor 104 may select and execute a corresponding ingestion pathway 132 to acquire source data 140 from medical, third-party administrator, pharmacy benefit management, pharmacy, or member-interaction environments in compliance with applicable access constraints 120 while preserving real-time availability. The processor 104 may further generate structured data objects 144 from member-generated interactions occurring within system-controlled interfaces 148 and may programmatically link such data objects 144 with data records 116 comprising clinical and financial records to produce a unified, continuously updated data structure 112. In some embodiments, by dynamically resolving license permissions and controlling ingestion pathways 132 at the processor 104 level, the disclosed architecture may enable acquisition and unification of heterogeneous healthcare data streams at or near the time of care or member interaction, thereby reducing latency, preventing unauthorized access to non-permissible data sources 152, and improving the technical operation of healthcare data processing systems relative to conventional license-siloed or claims-based architectures.

With continued reference to FIG. 1, the processor 104 receives a plurality of data signals 128 from a plurality of operational environments 156 in real time. For the purposes of this disclosure, "data signals" are electronic transmissions containing information associated with events, transactions, interactions, or system states. In some cases, data signals 128 may include an indication of an operational license associated with the originating operational environments 156. In some embodiments, the operational license may correspond to at least one of a medical license, a brokerage license, a third-party administrator license, a pharmacy benefit management license, or a pharmacy license. In certain embodiments, the operational license may represent a regulatory authorization under which the operational environments 156 are permitted to generate, transmit, or access particular categories of information. In some cases, the operational license may be embedded within metadata of the data signals 128 as a structured attribute, a coded identifier, a textual designation, or a digital credential transmitted alongside the payload of the data signals 128. In some embodiments, different data signals 128 may correspond to different operational licenses, and the apparatus 100 may receive data signals 128 associated with multiple distinct operational licenses during overlapping time intervals. For the purposes of this disclosure, "operational environments" are distinct computing domains from which data signals 128 originate. In some embodiments, operational environments 156 may include external systems, user-facing systems, transactional platforms, or distributed data repositories.

With continued reference to FIG. 1, for the purposes of this disclosure, "real time" is processing of data within a bounded latency interval relative to an originating event. In some cases, real time data processing may allow acquisition of source data 140 and generation of the data structure 112 occur during an active operational state associated with the originating event. Real time data processing may allow execution within a deterministic or predefined temporal window measured in seconds, sub-seconds, or system-defined processing intervals following receipt of the data signals 128. Real time data processing may exclude deferred batch processing performed after closure of the originating operational state. In some embodiments, real time processing may include event-driven execution triggered immediately upon receipt of the data signals 128. In certain embodiments, real time may be enforced through latency thresholds stored in the memory 108 and monitored by the processor 104 during execution of the ingestion pathway 132.

With continued reference to FIG. 1, the plurality of data signals 128 may include at least one data signal 128 received from a system-controlled interface 148. For the purposes of this disclosure, "system-controlled interface" is an input or interaction channel directly managed by the apparatus 100. In some cases, system-controlled interface 148 may be configured to generate structured interaction data for processing within the apparatus 100. The system-controlled interface 148 may include a user interface, an application interface, a portal interface, or an automated interaction module. For the purposes of this disclosure, a "user interface" is a means by which a user and a computer system interact. For example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface in virtual reality. In some embodiments, a user may interact with the user interface using a computing device distinct from and communicatively connected to at least a processor 104. For example, a smart phone, smart, tablet, or laptop operated by a user. In an embodiment, user interface may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons.

Using an icon may be a fast way to open documents, run program, and the like because clicking on them yields instant access.

With continued reference to FIG. 1, in some embodiments, the system-controlled interface 148 may capture interaction data including selections, textual inputs, event confirmations, scheduling interactions, transactional confirmations, or contextual behavioral signals generated by a user or automated agent. The interaction data may be embedded within the data signals 128 and may be processed as source data 140 during execution of the ingestion pathway 132. For the purposes of this disclosure, "interaction data" is electronically captured information representing an action, input, response, or behavioral event generated through a system-controlled interface and transmitted within data signals 128. Interaction data may be distinct from source data 140 acquired from permissible data sources 124 and instead originates from direct engagement with the apparatus 100 or an operational environment 156 under control of the apparatus 100. Interaction data may include structured inputs, unstructured textual entries, selection events, navigation events, confirmation actions, scheduling actions, transactional confirmations, communication exchanges, and other electronically recorded engagement indicators. In some embodiments, interaction data may include user-entered textual content, button selections, form submissions, menu selections, cursor movements, screen navigation events, timestamped acknowledgments, digital signatures, message exchanges, or application usage telemetry. In some embodiments, interaction data may include structured fields such as categorical selections, numerical inputs, or boolean confirmations captured through predefined interface elements. In certain embodiments, interaction data may include unstructured natural language input captured through text entry fields or voice-to-text systems and transmitted within data signals 128 for downstream processing by the processor 104. In some embodiments, interaction data may be captured contemporaneously with a member interaction, system engagement event, or automated workflow execution. In some embodiments, interaction data may include contextual metadata such as interaction timestamps, session identifiers, device identifiers, interface state identifiers, and operational license indicators associated with the operational environments 156. In certain embodiments, interaction data may reflect behavioral signals including frequency of access, sequence of navigation steps, response latency, abandonment events, or repeated inquiry patterns. In some embodiments, interaction data may be encoded within the data signals 128 as structured payload elements or as serialized data objects transmitted from the system-controlled interface 148 to the apparatus 100. In some embodiments, interaction data may be validated by the processor 104 prior to determination of the access context 136. In certain embodiments, interaction data may be transformed into data objects 144 and unified into the data structure 112 alongside source data 140 acquired through constrained data sessions 160, thereby enabling integration of behavioral information with externally acquired records.

With continued reference to FIG. 1, the processor 104 determines, at runtime, an access context 136 for each data signal 128. For the purposes of this disclosure, "access context" is a control state governing selection of permissible data sources 124 and enforcement of access constraints 120 for a given data signal 128. The processor 104 may evaluate attributes of the data signal 128 to determine the corresponding access context 136. In some embodiments, the processor 104 may extract metadata fields from the data signal 128, including source identifiers, timestamps, data categories, or origin attributes, and may determine the access context 136 based on such metadata. In certain embodiments, the access context 136 may be represented internally as a structured control object stored in the memory 108.

With continued reference to FIG. 1, for the purposes of this disclosure, "at runtime" is execution of instructions by the processor 104 during active processing of data signals 128 and during live operation of the system. At runtime may refer to decision-making, state determination, and control logic execution occurring dynamically in response to receipt of each data signal 128. In some embodiments, determining the access context 136 at runtime means that the processor 104 computes the access context 136 during processing of an individual data signal 128 using attributes of that data signal 128 and current system state stored in the memory 108. In some embodiments, at runtime computation may include extracting metadata from the data signal 128, evaluating policy objects corresponding to access constraints 120, and generating control objects representing the access context 136 without relying solely on predetermined static mappings. In certain embodiments, at runtime determination may incorporate current session information, temporal attributes, operational license indicators, or prior enforcement events stored in the memory 108. In some embodiments, at runtime processing may further include dynamic selection of the ingestion pathway 132 based on the determined access context 136 and may include real-time establishment of the constrained data session 160. In some embodiments, at runtime operations may be executed within a bounded latency window defined by system performance thresholds associated with real time processing. In certain embodiments, at runtime may include modification of enforcement parameters of the access constraints 120 during execution of the constrained data session 160 in response to current operational conditions.

With continued reference to FIG. 1, each access context 136 is associated with one or more permissible data sources 124. For the purposes of this disclosure, "permissible data sources" are data repositories or interfaces authorized for acquisition of source data 140. The processor 104 may reference the permissible data sources 124 associated with the access context 136 prior to initiating acquisition of source data 140. In some embodiments, the permissible data sources 124 may include relational databases, document-oriented databases, graph databases, key-value storage systems, distributed file systems, application programming interfaces, streaming data brokers, transactional processing systems, electronic health record systems, claims adjudication systems, pharmacy dispensing systems, pharmacy benefit management platforms, third-party administrator systems, brokerage management systems, eligibility verification systems, scheduling systems, billing systems, payment processing systems, member portals, secure file transfer endpoints, or cloud-based data warehouses accessible over a network. In some cases, the permissible data sources 124 may include internal repositories maintained within the memory 108 of the apparatus 100, including historical data records 116 generated during prior ingestion pathways 132. In some embodiments, the permissible data sources 124 may be accessed through encrypted communication channels, authenticated service endpoints, federated identity gateways, or role-based access control mechanisms configured to enforce access constraints 120 during execution of the constrained data session 160.

With continued reference to FIG. 1, each access context 136 is further associated with one or more access constraints 120. For the purposes of this disclosure, "access constraints" are executable rule sets governing timing, scope, and conditions under which source data 140 may be acquired. The processor 104 enforces the access constraints 120 during execution of the ingestion pathway 132. In some embodiments, access constraints 120 may include timing constraints, field-level restrictions, record-level filters, session duration limits, or volume limits. In certain embodiments, access constraints 120 may be stored as structured policy objects in the memory 108 and evaluated prior to and during the constrained data session 160.

With continued reference to FIG. 1, for the purposes of this disclosure, a "timing constraint" is a rule within the access constraints 120 that defines an authorized temporal window or temporal condition under which acquisition of source data 140 is permitted. A timing constraint may specify absolute time boundaries, relative time intervals, event-triggered windows, or frequency-based limitations tied to defined operational events. In some embodiments, a timing constraint may permit acquisition of source data 140 only within a predefined duration following a triggering event. In certain embodiments, a timing constraint may require that acquisition occur contemporaneously with, or within a threshold time period of, an entity interaction. In some cases, the timing constraint may restrict retrieval of historical records outside an authorized retrospective window defined in the access constraints 120.

With continued reference to FIG. 1, for the purposes of this disclosure, "entity interaction" is a discrete event involving an entity within one or more operational environments 156 that generates or modifies source data 140. An entity interaction may include a user-initiated action, a system-generated event, a transactional confirmation, or an external data exchange involving the entity. In some embodiments, an entity interaction may include scheduling an appointment, initiating a benefit verification, submitting a claim, requesting authorization, filling a prescription, confirming attendance, making a payment, or engaging with a system-controlled interface 148. In certain embodiments, an entity interaction may include automated system events such as eligibility updates, status changes, claim adjudication outcomes, or transaction completions associated with the entity identifier.

With continued reference to FIG. 1, in some cases, the one or more access constraints 120 may include timing constraints that permit acquisition of data at a time of entity interaction. In such embodiments, the processor 104 may evaluate timestamps associated with data signals 128 or operational events to determine whether the constrained data session 160 is being initiated within an authorized temporal window defined by the timing constraint. If the temporal condition is satisfied, the processor 104 may proceed with acquisition of source data 140. If the temporal condition is not satisfied, the processor 104 may block acquisition or delay execution of the ingestion pathway 132 consistent with enforcement of the access constraints 120.

With continued reference to FIG. 1, determining the access context 136 may include generating context training data including labeled data acquisition events indicating compliance with the one or more access constraints 120. The context training data may include historical source data 140 previously acquired through constrained data sessions 160 and labeled as compliant or non-compliant based on whether enforcement of the access constraints 120 was satisfied. In some embodiments, the labeling process may be performed by analyzing enforcement logs stored in the memory 108 and assigning compliance labels to past acquisition events. In certain embodiments, the context training data may include feature vectors derived from metadata attributes of historical data signals 128, including source identifiers, timing attributes, data categories, and prior enforcement outcomes. For the purposes of this disclosure, "context training data" is a labeled dataset comprising historical data acquisition events and associated feature representations. Context training data may include structured feature vectors derived from prior data signals and corresponding labels indicating compliant or non-compliant access context 136 determinations or correct access context 136 classifications under the one or more access constraints 120. In some cases, context training data may include metadata attributes extracted from historical data signals 128, including source identifiers, operational license indicators, timestamps, interaction attributes, prior access context 136 assignments, and enforcement outcomes recorded during execution of prior constrained data sessions 160. In some embodiments, each training instance within the context training data may include a feature vector representing attributes of a historical data signal 128 and a corresponding ground truth label representing the correct access context 136 determined through prior validated processing. In certain embodiments, the ground truth labels may be generated through manual review of historical acquisition events, automated validation against policy definitions stored in the memory 108, or post-processing audits of enforcement logs. In some cases, the source of the context training data may include historical source data 140 acquired through prior ingestion pathways 132 and stored within the memory 108 of the apparatus 100. In some embodiments, the context training data may be derived from enforcement logs generated during prior constrained data sessions 160, wherein each logged event includes identifiers of the access context 136, permissible data sources 124, access constraints 120 applied, and any violation events. In some cases, the context training data may include simulated acquisition scenarios generated within the apparatus 100 to represent hypothetical combinations of data signals 128 and access contexts 136 for purposes of augmenting the diversity of labeled training examples used to train the context machine-learning model 164.

With continued reference to FIG. 1, in some cases, determining the access context 136 may further include training a context machine-learning model 164 using the context training data. For the purposes of this disclosure, "context machine-learning model" is a trained computational model configured to generate a context score 168 for determining the access context 136 associated with a data signal 128. The context machine-learning model 164 may include, without limitation, a classification model, a neural network, a decision tree ensemble, a gradient boosting model, a support vector machine, or other supervised learning model. In some embodiments, the context machine-learning model 164 may be trained using labeled feature vectors extracted from historical data acquisition events, wherein each feature vector corresponds to a prior data signal 128 and each label corresponds to a known compliant access context 136. In certain embodiments, the context machine-learning model 164 may optimize model parameters by minimizing a loss function computed over the labeled training data.

With continued reference to FIG. 1, determining the access context 136 may further include generating, for each data signal 128, a context score 168 using the trained context machine-learning model 164. For the purposes of this disclosure, "context score" is an output value generated by the context machine-learning model 164 representing a quantitative or categorical assessment associated with a candidate access context 136. The context score 168 is a machine-generated value computed from feature representations of the data signal 128 and reflects a modeled likelihood, classification output, ranking metric, or multi-class assignment corresponding to one or more possible access contexts 136. In some cases, the context score 168 may include a probability value between zero and one representing likelihood that a data signal 128 corresponds to a particular access context 136. In some embodiments, the context score 168 may include a vector of probabilities corresponding to multiple candidate access contexts 136, wherein each probability represents a modeled confidence level for a distinct access context 136 classification. In certain embodiments, the context score 168 may include a numerical risk score derived from evaluation of compliance features associated with the data signal 128, and the processor 104 may determine the access context 136 based on a comparison between the numerical risk score and one or more predefined threshold values stored in the memory 108. In some embodiments, the context score 168 may be derived from intermediate activation layers of the context machine-learning model 164, and the processor 104 may apply post-processing logic to convert raw model outputs into normalized classification scores. In certain embodiments, the processor 104 may compute the context score 168 by applying a softmax transformation to raw logits generated by the context machine-learning model 164 in a multi-class classification architecture. In some cases, the context score 168 may be calibrated using historical validation datasets to align predicted probabilities with observed frequencies of correctly assigned access contexts 136. In some cases, the processor 104 may extract feature vectors from the incoming data signal 128, including metadata attributes, operational license indicators, interaction data attributes, timestamp values, and prior context assignments stored in the memory 108, and may input the feature vectors into the context machine-learning model 164 to compute the context score 168. In some embodiments, the feature vectors may include numerical encodings of categorical attributes, normalized time representations, and binary indicators corresponding to the presence or absence of specific data elements within the data signal 128. In certain embodiments, the processor 104 may concatenate multiple feature groups to form a composite feature vector used as input to the context machine-learning model 164. In some cases, processor 104 may compare the context score 168 to one or more threshold values stored in the memory 108 to determine the selected access context 136. In some embodiments, if the context score 168 for a candidate access context 136 exceeds a predefined selection threshold, the processor 104 may assign the corresponding access context 136 to the data signal 128. In certain embodiments, if multiple candidate access contexts 136 have context scores 168 exceeding respective thresholds, the processor 104 may select the access context 136 associated with the highest context score 168. In some cases, if no context score 168 satisfies the selection threshold, the processor 104 may assign a default access context 136, flag the data signal 128 for manual review, or apply a conservative enforcement profile within the ingestion pathway 132. In some cases, the context score 168 may also be stored in the memory 108 as part of processing metadata associated with the data signal 128. In some embodiments, the stored context score 168 may be used for auditing, model retraining, or performance monitoring of the context machine-learning model 164. In certain embodiments, historical context scores 168 may be incorporated into updated context training data to refine the context machine-learning model 164 through iterative retraining cycles.

With continued reference to FIG. 1, the processor 104 selects and executes, for each data signal 128, an ingestion pathway 132 as a function of the access context 136. For the purposes of this disclosure, "ingestion pathway" is an ordered sequence of executable operations defining how source data 140 is acquired, validated, transformed, and unified into the data structure 112. The ingestion pathway 132 is not a single instruction but a structured execution workflow stored in the memory 108 and invoked by the processor 104 in response to the determined access context 136. In some embodiments, the processor 104 may select the ingestion pathway 132 by matching the access context 136 to a stored ingestion configuration within the memory 108. In some embodiments, the stored ingestion configuration may include a sequence definition comprising retrieval operations, constraint enforcement modules, transformation modules, validation checks, and unification procedures. In certain embodiments, the ingestion pathway 132 may be instantiated dynamically by the processor 104 based on parameters defined in the access context 136, including references to permissible data sources 124 and access constraints 120. In some embodiments, different ingestion pathways 132 may correspond to different combinations of permissible data sources 124 and access constraints 120. In some embodiments, one ingestion pathway 132 may be configured to retrieve structured records from a relational database permissible data source 124 and apply field-level filtering defined by access constraints 120. In certain embodiments, another ingestion pathway 132 may be configured to retrieve event-based data from a streaming permissible data source 124 and apply timing-based validation prior to transformation. In some cases, a distinct ingestion pathway 132 may be configured to retrieve unstructured textual source data 140 and apply parsing logic prior to transformation into data objects 144. In some embodiments, ingestion pathway 132 may include multiple execution stages. In some embodiments, a first stage may include establishment of the constrained data session 160 and validation of authentication credentials. In certain embodiments, a second stage may include generation of structured retrieval queries parameterized by access constraints 120. In some cases, a third stage may include validation of response payloads received as source data 140 to ensure compliance with record-level or field-level constraints. In some embodiments, a fourth stage may include transformation of the source data 140 into data objects 144 according to schema definitions stored in the memory 108. In some embodiments, the ingestion pathway 132 may include conditional branching logic executed by the processor 104. In some embodiments, conditional branches may be triggered based on attributes of the data signal 128, characteristics of the source data 140, or values of the context score 168 generated by the context machine-learning model 164. In certain embodiments, the processor 104 may dynamically skip, repeat, or augment specific execution stages within the ingestion pathway 132 based on evaluation of intermediate validation outcomes. In some embodiments, the ingestion pathway 132 may further include monitoring and logging operations. In some embodiments, the processor 104 may record timestamps associated with each stage of execution of the ingestion pathway 132 in the memory 108 to enable latency tracking consistent with real time processing requirements. In certain embodiments, the processor 104 may record identifiers of permissible data sources 124 accessed, access constraints 120 enforced, and any violations detected during execution of the constrained data session 160. In some embodiments, the ingestion pathway 132 may be represented within the memory 108 as a structured execution template comprising references to executable modules, parameter definitions, and constraint enforcement logic. In some embodiments, the processor 104 may construct the ingestion pathway 132 as an execution graph in which nodes correspond to operational stages and edges correspond to permissible execution transitions. In certain embodiments, the processor 104 may validate the constructed ingestion pathway 132 against a registry of authorized configurations to ensure consistency with the determined access context 136 prior to execution. In some cases, the ingestion pathway 132 may include fallback or remediation stages. In some embodiments, if acquisition of source data 140 fails due to timeout, constraint violation, or communication error, the processor 104 may execute a retry stage within the ingestion pathway 132. In certain embodiments, the processor 104 may transition to a conservative enforcement mode within the ingestion pathway 132, wherein scope of data acquisition is reduced and additional validation checks are applied prior to transformation into data objects 144. In some embodiments, the ingestion pathway 132 may be executed independently for each data signal 128, such that multiple ingestion pathways 132 may be active concurrently within the processor 104. In some embodiments, the processor 104 may isolate execution contexts for concurrent ingestion pathways 132 to prevent cross-contamination of permissible data sources 124 or access constraints 120 associated with distinct access contexts 136. In certain embodiments, the processor 104 may employ synchronization mechanisms within the memory 108 to ensure that updates to the data structure 112 arising from different ingestion pathways 132 occur in a consistent and transactionally coherent manner.

With continued reference to FIG. 1, executing the ingestion pathway 132 includes establishing a constrained data session 160 with the one or more permissible data sources 124 associated with the access context 136. For the purposes of this disclosure, "constrained data session" is an authenticated communication channel established under enforcement of access constraints 120. The processor 104 may establish the constrained data session 160 prior to acquisition of source data 140 by initiating a secure transport negotiation with the permissible data sources 124 and binding session-level identifiers to the access context 136 stored in the memory 108. In some embodiments, establishing the constrained data session 160 may include performing credential validation using digital certificates, cryptographic keys, token-based authentication, or federated identity mechanisms associated with the permissible data sources 124. In certain embodiments, the processor 104 may retrieve authorization tokens from an identity provider system and associate those tokens with a session object stored in the memory 108 that represents the constrained data session 160. In some cases, the session object may include a session identifier, expiration timestamp, associated access context 136 identifier, references to permissible data sources 124, and encoded representations of access constraints 120 that are enforceable during execution of the ingestion pathway 132.

With continued reference to FIG. 1, establishing the constrained data session 160 may further include negotiating session parameters that define permissible query types, maximum response sizes, allowed communication protocols, encryption standards, and timeout intervals. In some embodiments, the processor 104 may generate a session policy descriptor derived from the access constraints 120 and transmit the session policy descriptor to the permissible data sources 124 during session initialization. In certain embodiments, the processor 104 may store a local mirror of the session policy descriptor within the memory 108 to enable real-time validation of outbound and inbound communication occurring within the constrained data session 160.

With continued reference to FIG. 1, establishing the constrained data session 160 includes enforcing the one or more access constraints 120 during the constrained data session 160. The processor 104 may apply the access constraints 120 at multiple enforcement layers, including pre-request validation, mid-session monitoring, and post-response filtering. In some embodiments, prior to transmitting any retrieval request to the permissible data sources 124, the processor 104 may parse request parameters and validate that requested fields, date ranges, entity identifiers, or record limits fall within the boundaries defined by the access constraints 120. In certain embodiments, the processor 104 may generate structured queries dynamically and constrain query clauses to ensure that only authorized subsets of source data 140 are requested.

With continued reference to FIG. 1, enforcement of the access constraints 120 during the constrained data session 160 may include continuous monitoring of data volume, request frequency, and temporal alignment relative to timing constraints stored within the access constraints 120. In some embodiments, the processor 104 may maintain counters within the session object stored in the memory 108 to track cumulative records retrieved and may terminate the constrained data session 160 if cumulative retrieval exceeds predefined thresholds defined in the access constraints 120. In certain embodiments, the processor 104 may compare timestamps embedded within response payloads to authorized time windows defined by the access constraints 120 and may discard or redact any source data 140 falling outside the permitted interval.

With continued reference to FIG. 1, the processor 104 may further enforce the access constraints 120 by performing field-level validation on response payloads received from permissible data sources 124. In some embodiments, the processor 104 may inspect each returned attribute of the source data 140 and may remove, mask, or transform attributes that are not authorized under the access constraints 120 before transformation into data objects 144. In certain embodiments, enforcement may include validation of record-level eligibility conditions, such that records not meeting eligibility criteria defined within the access constraints 120 are excluded from subsequent processing within the ingestion pathway 132.

With continued reference to FIG. 1, enforcement of the access constraints 120 may include behavioral enforcement within the constrained data session 160. In some embodiments, the processor 104 may detect anomalous patterns of retrieval attempts inconsistent with the access context 136 and may dynamically tighten permissible query scopes or shorten session duration. In certain embodiments, the processor 104 may update session state variables stored in the memory 108 to reflect incremental enforcement decisions made during execution of the constrained data session 160.

With continued reference to FIG. 1, the constrained data session 160 may include lifecycle management operations. In some embodiments, the processor 104 may initialize the constrained data session 160 with a defined start time, enforce constraints during active execution, and formally close the session upon completion of source data 140 acquisition. In certain embodiments, the processor 104 may revoke session credentials, invalidate session identifiers, and archive session metadata within the memory 108 upon termination of the constrained data session 160 to ensure traceability and compliance auditing.

With continued reference to FIG. 1, selecting the ingestion pathway 132 may include selecting the ingestion pathway 132 as a function of the context score 168. In some embodiments, the processor 104 may maintain multiple ingestion pathway 132 templates corresponding to different access contexts 136, and may select among them based on the context score 168. In certain embodiments, the processor 104 may dynamically reconfigure parameters of the ingestion pathway 132 based on the magnitude or classification associated with the context score 168.

With continued reference to FIG. 1, enforcing the one or more access constraints 120 during the constrained data session 160 may include automatically modifying enforcement of the access constraints 120 as a function of the context score 168. In some embodiments, the processor 104 may retrieve the context score 168 generated by the context machine-learning model 164 and evaluate the context score 168 against one or more predefined enforcement tiers stored in the memory 108. In certain embodiments, the enforcement tiers may correspond to graduated constraint profiles, each defining a distinct set of permissible data sources 124, attribute scopes, temporal windows, and volume thresholds. If the context score 168 falls within a first confidence range, the processor 104 may apply a baseline enforcement profile. If the context score 168 falls within a second range indicating uncertainty or elevated risk, the processor 104 may apply a restrictive enforcement profile with tightened constraint parameters.

With continued reference to FIG. 1, in some embodiments, restricting a scope of data acquisition based on the context score 168 may include dynamically rewriting retrieval queries generated during execution of the ingestion pathway 132. The processor 104 may remove optional fields from query parameter sets, reduce maximum record limits, constrain entity identifier ranges, or narrow date intervals permitted under timing constraints. In certain embodiments, the processor 104 may dynamically adjust rate limits associated with the constrained data session 160 by modifying allowed request frequency, permitted concurrency levels, or cumulative data volume thresholds stored in the session state within the memory 108.

With continued reference to FIG. 1, in some embodiments, the processor 104 may update enforcement parameters stored within the constrained data session 160 object based on the context score 168. The constrained data session 160 object may include mutable policy variables representing attribute-level permissions, temporal boundaries, field visibility masks, and retrieval quotas. The processor 104 may overwrite or recalibrate these variables in real time prior to issuance of subsequent retrieval operations. In certain embodiments, the processor 104 may maintain an audit trail within the memory 108 documenting the original enforcement configuration, the adjusted enforcement configuration, the associated context score 168, and timestamps corresponding to each enforcement modification.

With continued reference to FIG. 1, in some embodiments, if the context score 168 indicates elevated risk of misclassification of the access context 136, the processor 104 may require additional validation steps prior to further data acquisition. Such validation steps may include re-evaluating feature vectors associated with the data signal 128, re-querying the context machine-learning model 164, or temporarily suspending retrieval operations until supplemental verification criteria are satisfied. In certain embodiments, the processor 104 may apply multi-factor verification logic requiring confirmation from a secondary rule-based validation module prior to relaxing enforcement parameters when the context score 168 indicates marginal confidence.

With continued reference to FIG. 1, the modification of enforcement of the access constraints 120 may further include terminating the constrained data session 160. In some embodiments, if the context score 168 exceeds a predefined risk threshold indicating high probability of unauthorized access context 136 determination, the processor 104 may terminate the constrained data session 160 prior to completion of source data 140 acquisition. In certain embodiments, termination of the constrained data session 160 may include revoking authentication credentials associated with the session, invalidating session tokens stored in the memory 108, closing active network sockets, and purging session-specific buffers containing partially acquired source data 140.

With continued reference to FIG. 1, in some embodiments, the processor 104 may log termination events associated with context score 168-triggered enforcement escalation. The logged record may include the context score 168 value, the access context 136 identifier, identifiers of the permissible data sources 124 involved, and timestamps corresponding to termination. In certain embodiments, these logged termination events may subsequently be incorporated into context training data to improve calibration of the context machine-learning model 164 and refine future enforcement decisions.

With continued reference to FIG. 1, the one or more access constraints 120 may include timing constraints that permit acquisition of data at or near a time of care, prescription, discharge, or member interaction. In some embodiments, timing constraints may be represented as allowable time windows defined relative to timestamps contained within the data signals 128. In certain embodiments, the processor 104 may compare the timestamp of a data signal 128 to permitted timing windows stored within the access constraints 120 to determine whether acquisition of source data 140 is authorized. If a data signal 128 falls outside the permitted timing window, the processor 104 may prevent establishment of the constrained data session 160.

With continued reference to FIG. 1, the processor 104 acquires, using the constrained data session 160, source data 140 from the one or more permissible data sources 124. For the purposes of this disclosure, "source data" is information retrieved from permissible data sources 124 under enforcement of access constraints 120 and prior to transformation into data objects 144. Source data 140 may represent raw, semi-processed, or partially structured information generated within operational environments 156 and transmitted through the constrained data session 160 in response to retrieval operations initiated by the processor 104. In some embodiments, source data 140 may include heterogeneous data formats originating from distinct system architectures. In some embodiments, the source data 140 may include structured relational records comprising rows and columns aligned to predefined schema fields within a database permissible data source 124. In certain embodiments, the source data 140 may include hierarchical or document-based records encoded in nested attribute structures, key-value representations, or object-based encodings. In some cases, the source data 140 may include graph-oriented representations comprising node entities and relationship edges representing associations among entities maintained within a graph-based permissible data source 124. In some embodiments, the source data 140 may further comprise semi-structured or unstructured content retrieved as part of the constrained data session 160. In some embodiments, the source data 140 may include narrative entries, encoded message exchanges, survey responses, or interaction transcripts. In certain embodiments, the source data 140 may be serialized using extensible markup representations, structured text encodings, or object serialization formats, and the processor 104 may parse such encodings prior to transformation into data objects 144. In some embodiments, the source data 140 may include transactional event data corresponding to discrete operational events occurring within the operational environments 156. In some embodiments, such transactional data may include event identifiers, event timestamps, state transitions, status indicators, authorization outcomes, scheduling confirmations, benefit verification results, or dispensing confirmations. In certain embodiments, the source data 140 may include sequential event logs representing ordered operational workflows executed within the permissible data sources 124. In some embodiments, the source data 140 may include domain-specific attributes retrieved from specialized permissible data sources 124. In some embodiments, the source data 140 may include eligibility indicators, benefit utilization metrics, claims adjudication data, prescription records, dispensing confirmations, scheduling data, billing records, or payment attributes. In certain embodiments, the source data 140 may include numerical measurements, cost allocations, coverage thresholds, deductible status values, or time-series measurements representing periodic system states. In some embodiments, the source data 140 may include behavioral context information reflecting patterns of engagement occurring within system-controlled interfaces 148. In some embodiments, behavioral context may include navigation sequences, interaction frequency, response latency, cancellation patterns, repeated inquiry behavior, or abandonment of partially completed workflows. In certain embodiments, behavioral context may be derived from ordered sequences of interaction events and encoded as structured attributes associated with the source data 140. In some embodiments, the source data 140 may further include decision drivers representing structured or inferred indicators influencing service selection, scheduling decisions, benefit utilization, or prescription fulfillment. In some embodiments, decision drivers may include explicit selections of cost tiers, preferred service locations, benefit categories, or appointment times. In certain embodiments, decision drivers may be inferred from interaction sequences including cost comparison queries, filter selections, eligibility checks, or repeated searches within operational environments 156. In some embodiments, source data 140 may include financial stress indicators reflecting economic sensitivity or constraint signals associated with an entity. In some embodiments, financial stress indicators may include installment plan selections, deferred payment requests, deductible status checks, benefit maximum proximity indicators, or declined service confirmations. In certain embodiments, financial stress indicators may be computed from ratios derived from transactional attributes, including out-of-pocket cost relative to coverage thresholds or frequency of utilization near benefit limits. In some embodiments, source data 140 may include care intent indicators representing expressed or inferred intentions to seek services or engage in benefit-related actions. In some embodiments, care intent indicators may include scheduling requests, appointment confirmations, pre-authorization initiations, prescription lookups, or inquiry submissions. In certain embodiments, care intent may be inferred from repeated engagement patterns, navigation depth within service pathways, or initiation of benefit-related workflows. In some embodiments, source data 140 may additionally include real-world outcome information that does not exist within traditional electronic health record datasets or claims datasets. In some embodiments, real-world outcome information may include attendance confirmations, cancellation reasons, refill adherence behavior, follow-up engagement events, satisfaction survey responses, symptom self-reporting entries, or post-service status updates. In certain embodiments, real-world outcome information may include time-stamped confirmations indicating that a service was completed, postponed, declined, substituted, or otherwise modified.

With continued reference to FIG. 1, the processor 104 may temporarily store the source data 140 in a staging region within the memory 108 prior to transformation into data objects 144. In some embodiments, the staging region may include structured buffers associated with the constrained data session 160. In certain embodiments, the processor 104 may perform schema validation, completeness checks, checksum verification, normalization of attribute formats, and integrity validation prior to transformation. In some cases, metadata associated with the source data 140, including retrieval timestamps, permissible data source identifiers, session identifiers, and access context 136 identifiers, may be stored alongside the primary payload to support traceability and auditing. In some embodiments, the source data 140 may therefore comprise a multi-modal and multi-domain dataset combining structured, semi-structured, unstructured, transactional, behavioral, financial, intent-based, and outcome-based information retrieved under enforcement of access constraints 120. In some embodiments, this heterogeneous source data 140 may subsequently be transformed into data objects 144 and unified into the data structure 112 to enable integrated representation across distinct access contexts 136.

With continued reference to FIG. 1, the processor 104 blocks acquisition of data from non-permissible data sources 152. For the purposes of this disclosure, "non-permissible data sources" are data sources not authorized under the determined access context 136. Blocking acquisition may include preventing establishment of a constrained data session 160 with any data source not identified as permissible under the access context 136. In some embodiments, prior to initiating any network connection, the processor 104 may validate a destination identifier associated with a requested data source against a registry of permissible data sources 124 stored within the memory 108. In certain embodiments, the registry may include cryptographic fingerprints, network endpoint addresses, domain identifiers, or service identifiers associated with authorized permissible data sources 124. In some cases, if the requested data source identifier does not match any entry in the registry corresponding to the determined access context 136, the processor 104 may suppress transmission of authentication credentials and may block connection establishment at the transport layer.

With continued reference to FIG. 1, blocking acquisition from non-permissible data sources 152 may further include intercepting outbound retrieval instructions generated during execution of the ingestion pathway 132 and validating that all retrieval instructions reference only permissible data sources 124 associated with the access context 136. In some embodiments, the processor 104 may implement a pre-execution validation routine that inspects query construction logic and verifies that the query target corresponds to an authorized permissible data source 124. In certain embodiments, the processor 104 may enforce network-level controls, including firewall rules or application-layer gateway policies, that restrict outbound communication to a predefined set of permissible data source endpoints associated with the access context 136.

With continued reference to FIG. 1, the processor 104 may also implement identity-bound validation during blocking operations. In some embodiments, authentication tokens or credentials used to establish the constrained data session 160 may be scoped specifically to the permissible data sources 124 associated with the access context 136, such that those credentials are technically invalid for use with non-permissible data sources 152. In certain embodiments, if an attempt is made to reuse credentials outside their authorized scope, the processor 104 may invalidate the credentials within the memory 108 and record a security event associated with the attempted acquisition.

With continued reference to FIG. 1, blocking acquisition of data from the non-permissible data sources 152 may further include runtime inspection of redirected or chained data requests. In some embodiments, if a permissible data source 124 attempts to redirect a retrieval request to another underlying data source not authorized under the access context 136, the processor 104 may detect the redirection through inspection of response headers, endpoint changes, or certificate variations and may terminate the retrieval sequence prior to acceptance of source data 140.

With continued reference to FIG. 1, blocking acquisition of data from the non-permissible data sources 152 may include automatically terminating the constrained data session 160 upon detection of a violation of the one or more access constraints 120 from the one or more permissible data sources 124. For the purposes of this disclosure, a "violation of access constraints" is a condition in which a data retrieval operation, response payload, session behavior, or data attribute deviates from parameters explicitly defined within the access constraints 120 associated with the access context 136.

With continued reference to FIG. 1, in some embodiments, a violation of access constraints 120 may include requesting or receiving attributes not included within a permitted attribute list defined for the access context 136. In certain embodiments, a violation may include retrieval of records outside an authorized date range, exceeding a maximum record count threshold, exceeding an authorized data volume threshold, or accessing data associated with an entity identifier not authorized under the access context 136. In some cases, a violation may include exceeding a permitted request frequency, breaching session duration limits, or attempting to escalate privileges beyond those encoded in the constrained data session 160.

With continued reference to FIG. 1, the processor 104 may detect a violation of access constraints 120 through multi-layered monitoring during execution of the constrained data session 160. In some embodiments, the processor 104 may implement pre-transmission validation by parsing outgoing retrieval instructions and comparing query parameters against constraint definitions stored in the memory 108. If a query requests attributes, entity identifiers, or temporal ranges not permitted under the access constraints 120, the processor 104 may classify the condition as a violation prior to transmitting the request.

With continued reference to FIG. 1, in certain embodiments, the processor 104 may perform runtime inspection of response payloads received from permissible data sources 124. The processor 104 may parse returned source data 140, extract attribute identifiers, and compare them against an allowed attribute registry stored in the memory 108. If returned source data 140 includes disallowed fields, unauthorized entity identifiers, or record segments outside defined boundaries, the processor 104 may flag the response as containing a violation of access constraints 120.

With continued reference to FIG. 1, in some embodiments, the processor 104 may implement quantitative threshold monitoring. The processor 104 may maintain session state variables within the memory 108 representing cumulative record counts, cumulative byte volume, number of requests issued, and elapsed session duration. The processor 104 may compare these values against numerical thresholds defined within the access constraints 120. If cumulative retrieval exceeds permitted limits or if request frequency surpasses an authorized rate, the processor 104 may determine that a violation of access constraints 120 has occurred.

With continued reference to FIG. 1, in certain embodiments, the processor 104 may detect violations through behavioral anomaly detection within the constrained data session 160. For example, if a permissible data source 124 attempts to redirect a query to an endpoint not listed among the permissible data sources 124 associated with the access context 136, the processor 104 may detect the endpoint deviation by inspecting response metadata or network-level identifiers and classify the deviation as a violation. Similarly, if response payload signatures or certificate information differ from expected cryptographic fingerprints stored in the memory 108, the processor 104 may detect potential unauthorized substitution and treat the condition as a violation of access constraints 120.

With continued reference to FIG. 1, upon detecting a violation, the processor 104 may immediately terminate the constrained data session 160 by invalidating the session identifier stored within the memory 108, revoking authentication tokens associated with the session, and closing network connections established with the permissible data sources 124. In some embodiments, termination may occur prior to transformation of the source data 140 into data objects 144 to prevent propagation of unauthorized information into the data structure 112. In certain embodiments, the processor 104 may generate a violation record comprising a timestamp, session identifier, access context 136 identifier, permissible data source 124 identifier, and description of the detected violation, and may store the violation record within the memory 108 for auditing and compliance review.

With continued reference to FIG. 1, blocking may include progressive enforcement actions prior to full termination of the constrained data session 160. In some embodiments, the processor 104 may first restrict subsequent retrieval operations by narrowing query parameters, reducing permissible record counts, or applying additional validation layers. In certain embodiments, if additional violations are detected after progressive restriction, the processor 104 may escalate enforcement to full termination of the constrained data session 160 and may update enforcement state variables stored in the memory 108 to reflect the escalation.

With continued reference to FIG. 1, the processor 104 may additionally correlate violation events across multiple constrained data sessions 160 to detect patterns of repeated non-compliance associated with specific permissible data sources 124 or access contexts 136. In some embodiments, aggregated violation metrics may be stored within the memory 108 and may be used to dynamically adjust enforcement parameters of the access constraints 120 for subsequent ingestion pathways 132 associated with similar access contexts 136.

With continued reference to FIG. 1, the processor 104 generates a data structure 112 comprising the source data 140. For the purposes of this disclosure, “data structure” is a persistent, machine-readable unified representation stored in the memory 108. Generating the data structure 112 includes transforming the source data 140 into one or more data objects 144. For the purposes of this disclosure, “data objects” are structured representations formatted according to a unified schema. The processor 104 may transform the source data 140 by mapping attributes to standardized schema fields defined within the data structure 112. In some cases, user interface may include data structure 112. As a non-limiting example, processor 104 may be configured to generate user interface displaying data structure 112.

With continued reference to FIG. 1, generating the data structure 112 may include generating transformation training data based on historical source data 140. For the purposes of this disclosure, “transformation training data” is a labeled dataset comprising raw source data instances paired with corresponding structured target representations defining desired data objects according to the schema of the data structure. The transformation training data may include input-output pairs in which each input corresponds to a previously acquired source data 140 instance and each output corresponds to a validated structured representation that conforms to the schema requirements of the data structure 112. The transformation training data may include alignment mappings between raw attribute fields and normalized schema fields, structured extraction targets for unstructured content, and standardized value encodings for categorical attributes. In some embodiments, source of the transformation training data may include historical source data 140 acquired through prior execution of ingestion pathways 132 and stored within the memory 108 of the apparatus 100. In some embodiments, previously transformed data objects 144 stored in the memory 108 may serve as ground truth targets for generating labeled pairs in the transformation training data. In certain embodiments, the transformation training data may be augmented using curated datasets derived from prior validated ingestion events, manually reviewed transformation outputs, or correction logs identifying discrepancies between raw source data 140 and finalized data objects 144. In some cases, synthetic transformation training data may be generated by programmatically altering historical source data 140 to simulate variations in format, structure, or content for robustness training of the transformation machine-learning model 172.

With continued reference to FIG. 1, generating the data structure 112 may further include training a transformation machine-learning model 172 using the transformation training data. For the purposes of this disclosure, “transformation machine-learning model” is a trained computational model configured to transform source data 140 into structured data objects 144 according to the schema of the data structure 112. The transformation machine-learning model 172 may include, without limitation, a sequence-to-sequence neural network, a transformer-based architecture, a structured prediction model, a conditional random field, a supervised regression model, or a hybrid architecture combining rule-based preprocessing with learned feature representations. In some embodiments, the transformation machine-learning model 172 may accept tokenized or vectorized representations of source data 140 as input and may output structured attribute-value pairs aligned with schema-defined fields. In certain embodiments, the transformation machine-learning model 172 may be trained by minimizing a reconstruction loss, classification loss, or sequence alignment loss computed between predicted structured outputs and labeled targets within the transformation training data. In some embodiments, training of the transformation machine-learning model 172 may include iterative optimization of model parameters using gradient-based optimization techniques applied to the transformation training data. In some embodiments, training may involve partitioning the transformation training data into training, validation, and test subsets stored within the memory 108. In certain embodiments, model performance metrics including field-level accuracy, schema compliance rate, extraction precision, and extraction recall may be computed to evaluate performance of the transformation machine-learning model 172 during training. In some cases, the processor 104 may retrain or fine-tune the transformation machine-learning model 172 periodically using newly accumulated transformation training data generated from recent ingestion pathways 132.

With continued reference to FIG. 1, transforming the source data 140 into the one or more data objects 144 using the trained transformation machine-learning model 172 may include inputting raw source data 140 into the transformation machine-learning model 172 to generate structured attribute outputs aligned with the schema of the data structure 112. In some embodiments, the transformation machine-learning model 172 may parse unstructured textual content within the source data 140 by tokenizing text sequences, generating contextual embeddings, and mapping identified entities or values to predefined schema fields. In certain embodiments, the transformation machine-learning model 172 may normalize date formats, standardize categorical encodings, reconcile synonymous attribute labels, and resolve nested hierarchical structures into flattened schema representations compatible with the data objects 144.

With continued reference to FIG. 1, the processor 104 may validate outputs of the transformation machine-learning model 172 against schema constraints stored in the memory 108 prior to unifying the data objects 144 into the data structure 112. In some embodiments, validation may include verifying required fields, confirming data type conformity, checking value ranges, and ensuring referential integrity relative to existing data records 116. In certain embodiments, if validation detects schema non-compliance, the processor 104 may apply corrective post-processing rules, flag the transformation output for review, or reprocess the source data 140 using alternative transformation parameters before final unification into the data structure 112.

With continued reference to FIG. 1, unifying the one or more data objects 144 generated under different access contexts 136 into the data structure 112 may include integrating the data objects 144 into persistent data records 116 stored in the memory 108. For the purposes of this disclosure, “data records” are persistent stored entities associated with an entity identifier used to link related data objects 144. A data record 116 may represent a logically unified representation of information associated with a defined entity, and the data record 116 persists across multiple ingestion pathways 132 and multiple constrained data sessions 160. In some embodiments, the data records 116 may include clinical records associated with an individual entity. Clinical records may include structured representations of diagnoses, procedures, medication histories, laboratory results, imaging summaries, appointment histories, treatment plans, and outcome indicators. In certain embodiments, clinical records may include longitudinal sequences of data objects 144 reflecting changes in clinical status over time, including time-stamped care events, service encounters, and adherence indicators derived from source data 140. In some embodiments, the data records 116 may include financial records associated with the same entity identifier. Financial records may include structured representations of claims adjudication outcomes, payment transactions, coverage limits, deductible status values, co-payment amounts, reimbursement amounts, cost allocations, benefit utilization metrics, and installment plan selections. In certain embodiments, financial records may include aggregated summaries computed from transactional source data 140 across multiple permissible data sources 124 and multiple access contexts 136. In some embodiments, the data records 116 may integrate both clinical records and financial records within a single persistent data record 116 linked by the entity identifier. In certain embodiments, the data structure 112 may maintain relational associations between clinical data objects 144 and financial data objects 144 to enable correlation of care events with corresponding cost events. In some cases, the data records 116 may also include behavioral data objects 144, decision driver data objects 144, financial stress indicator data objects 144, care intent data objects 144, and real-world outcome data objects 144 previously generated from source data 140, thereby forming a continuously updated, multi-dimensional representation associated with the entity identifier.

With continued reference to FIG. 1, unification into the data records 116 may include merging newly generated data objects 144 with preexisting data objects 144 associated with the same entity identifier, resolving conflicts among overlapping attributes, updating temporal sequences, and maintaining referential integrity within the memory 108. In certain embodiments, the processor 104 may maintain version history within the data records 116 to preserve prior states while appending newly unified data objects 144.

With continued reference to FIG. 1, unifying the one or more data objects 144 may include linking the one or more data objects 144 to one or more data records 116 stored in the memory 108 using an entity identifier. For the purposes of this disclosure, "entity identifier" is a unique identifier assigned to a defined entity. In some embodiments, an entity may correspond to an individual person, including a member, patient, subscriber, dependent, or authorized user represented within one or more operational environments 156. In certain embodiments, an entity may correspond to an organizational unit, including a provider organization, pharmacy, brokerage entity, third-party administrator entity, payer organization, or employer group. In some cases, an entity may correspond to a transactional object, including a claim, prescription, appointment, authorization request, benefit plan, or service encounter, where the transactional object is assigned its own entity identifier and persistent data record 116. In some cases, entity identifier may be used to associate related data objects 144 and data records 116 across multiple access contexts 136 and ingestion pathways 132. The entity identifier may provide a stable linkage mechanism within the data structure 112 such that all data objects 144 corresponding to the same underlying entity are logically grouped within the same data record 116. In some embodiments, entity identifier may be stored within the memory 108 and associated with each data record 116 as a primary linking attribute. In some embodiments, the entity identifier may comprise a system-generated alphanumeric string, a hashed representation of identifying attributes, a composite key derived from multiple normalized attributes, or a universally unique identifier generated by the processor 104. In certain embodiments, the entity identifier may be constructed through deterministic transformation of selected attributes contained within the source data 140, including normalized name fields, date attributes, numerical identifiers, or other unique attribute combinations, prior to transformation into data objects 144.

With continued reference to FIG. 1, in some embodiments, the processor 104 may derive the entity identifier from attributes contained within the source data 140 by applying normalization operations, including standardization of formatting, removal of extraneous characters, canonicalization of attribute representations, and validation against known attribute schemas stored in the memory 108. In certain embodiments, the processor 104 may generate a hash value from a concatenated set of normalized attributes to produce a consistent entity identifier even when the source data 140 originates from different permissible data sources 124 or different access contexts 136.

With continued reference to FIG. 1, the processor 104 may compare the derived entity identifier against existing identifiers stored in the memory 108 to determine whether to update an existing data record 116 or create a new data record 116 within the data structure 112. In some embodiments, the processor 104 may perform an exact match comparison between the derived entity identifier and previously stored entity identifiers. In certain embodiments, the processor 104 may perform probabilistic matching or similarity-based comparison using normalized attribute similarity scores when the derived entity identifier is constructed from partially incomplete or variably formatted source data 140.

With continued reference to FIG. 1, in some embodiments, if a matching entity identifier is found within the memory 108, the processor 104 may append or merge the newly generated data objects 144 into the corresponding existing data record 116. In certain embodiments, if no matching entity identifier is detected, the processor 104 may generate a new entity identifier and instantiate a new data record 116 within the data structure 112. In some cases, the processor 104 may maintain an index structure within the memory 108 to enable efficient lookup and comparison of entity identifiers during unification operations.

With continued reference to FIG. 1, in some embodiments, the apparatus 100 may improve a technical solution to a technical problem associated with fragmented, latency-prone, and license-siloed data acquisition architectures. In some embodiments, by dynamically determining the access context 136 at runtime, establishing the constrained data session 160 with enforcement of access constraints 120 at multiple layers, and programmatically blocking non-permissible data sources 152, the processor 104 may reduce unauthorized data propagation, minimize latency between entity interaction and data availability, and improve transactional consistency of the data structure 112. In certain embodiments, integration of the context machine-learning model 164 and transformation machine-learning model 172 may enable adaptive constraint enforcement and structured normalization of heterogeneous source data 140, thereby reducing computational overhead associated with manual rule reconciliation and schema harmonization. In some cases, the described architecture may improve system-level performance by isolating ingestion pathways 132, enforcing constraint-aware session controls, and unifying data objects 144 into persistent data records 116 using entity identifiers, thereby enhancing data integrity, reducing redundant retrieval operations, and improving scalability of real-time data processing across multiple operational environments 156.

Figure 2:
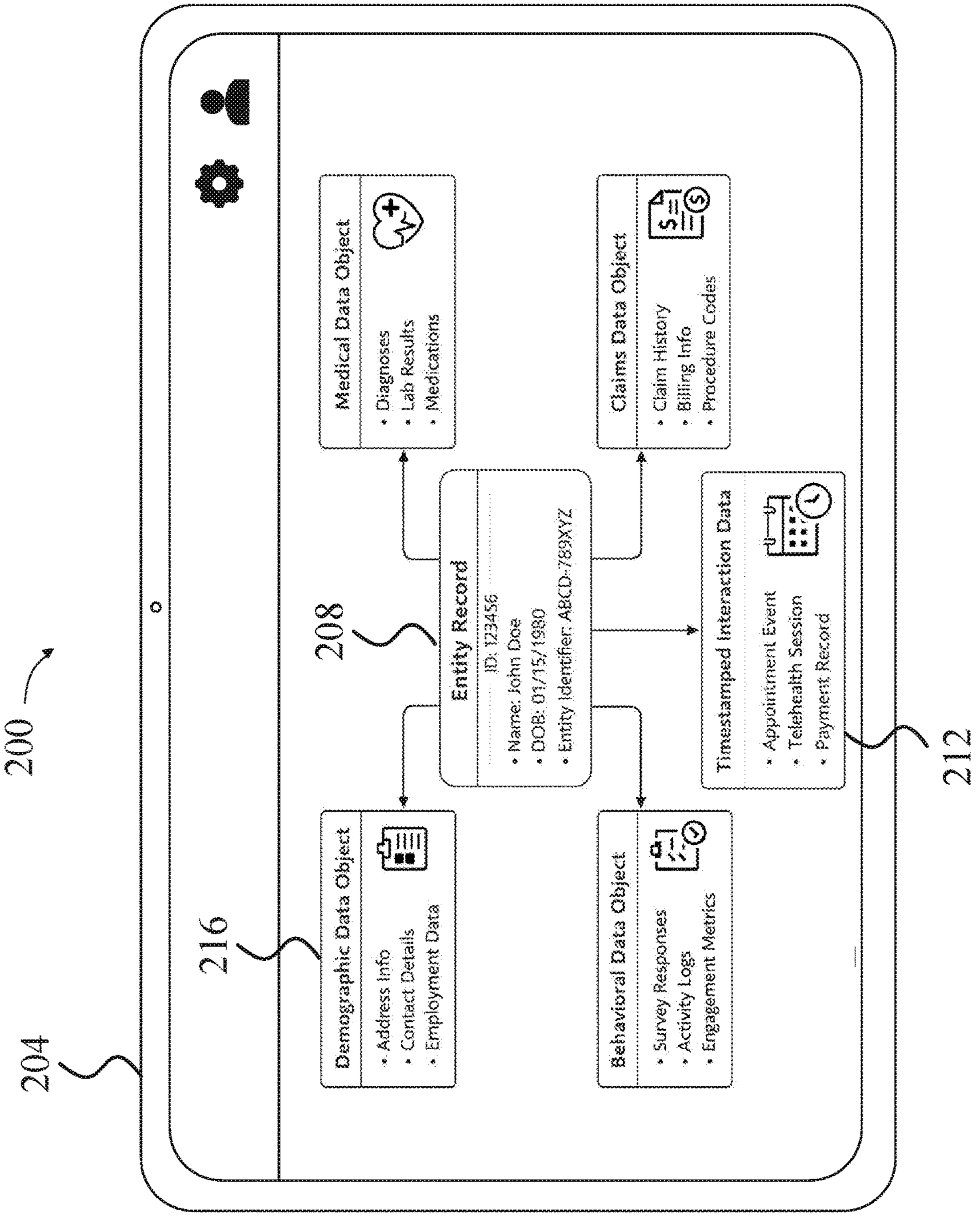
FIG. 2 illustrates an exemplary data structure.

Referring now to FIG. 2, an exemplary data structure 200 is illustrated. In some embodiments, the data structure 200 may be presented on a display device 204 and may include a data record 208 centrally positioned within the data structure 200. The data record 208 may represent a persistent stored entity and may be associated with one or more data objects 216 arranged around the data record 208. Each data object 216 may contain structured attributes corresponding to a particular category of information and may be logically linked to the data record 208 using an entity identifier. In some embodiments, the data structure 200 may further include interaction data 212 associated with the data record 208, wherein the interaction data 212 may comprise time-stamped events generated through system-controlled interfaces and linked to the data record 208. In certain embodiments, the data objects 216 may be connected to the data record 208 through directional linkages representing integration of heterogeneous data into the unified data structure 200. The display device 204 may render the data structure 200 in a manner that visually represents relationships among the data record 208, the interaction data 212, and the data objects 216, thereby illustrating how multiple categories of structured information may be unified within the data structure 200.

Figure 3:
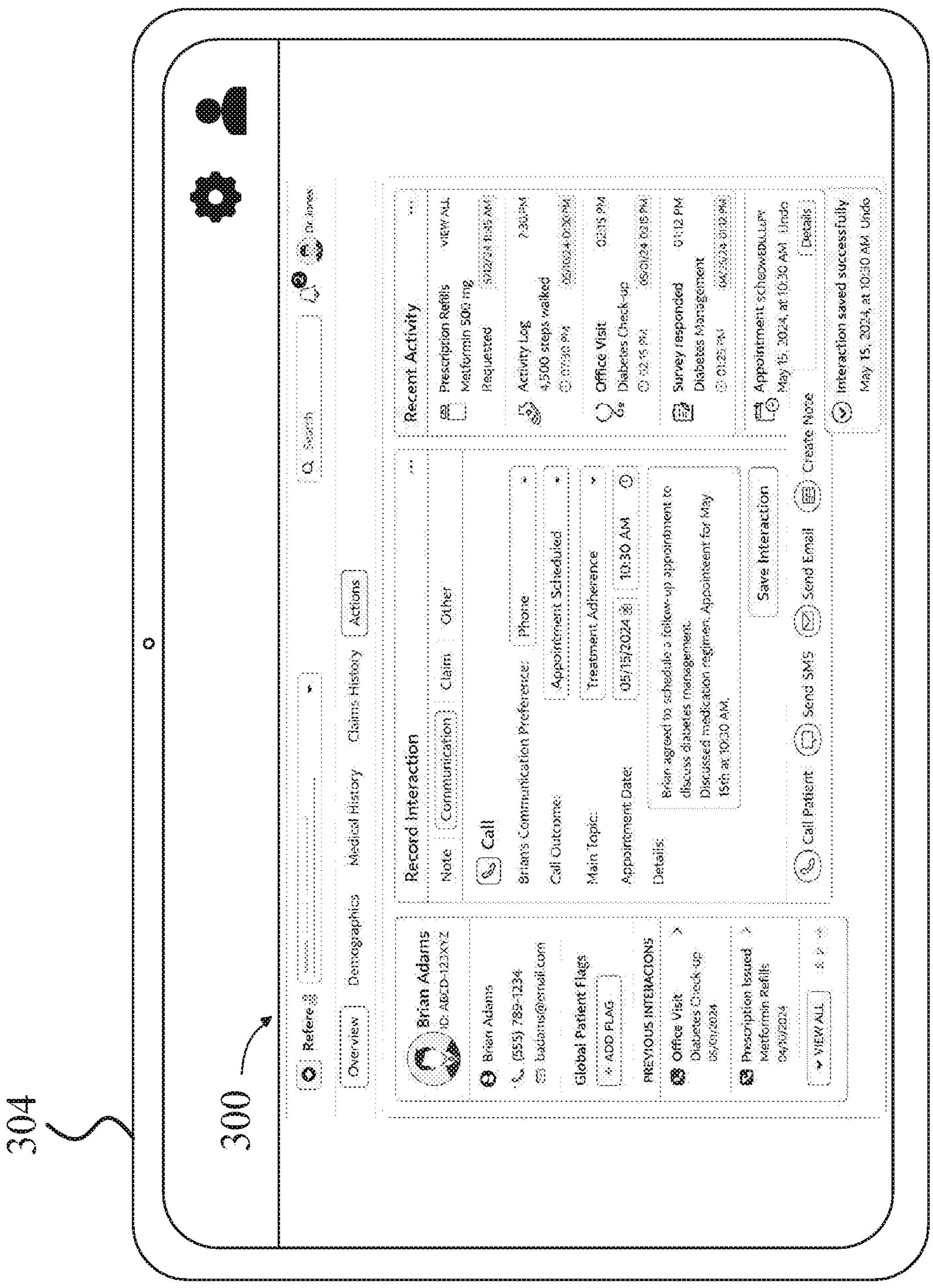
FIG. 3 illustrates an exemplary user interface.

Referring now to FIG. 3, an exemplary system-controlled interface 300 is illustrated. In some embodiments, the system-controlled interface 300 may be rendered on a display device 304 and may present structured interaction components configured to capture interaction data from an entity. The system-controlled interface 300 may include input fields, selectable controls, navigation elements, and action buttons arranged within a graphical layout. In certain embodiments, the display device 304 may include a touchscreen display, monitor, tablet display, or other visual output device configured to present graphical user interface elements. The system-controlled interface 300 may be configured to receive user-entered data, selections, confirmations, or requests and to transmit corresponding data signals to a processor for ingestion and processing. In some embodiments, the system-controlled interface 300 may dynamically update displayed information based on previously stored data records, interaction history, or newly received interaction data, thereby enabling bidirectional communication between the display device 304 and underlying processing components.

Figure 4:
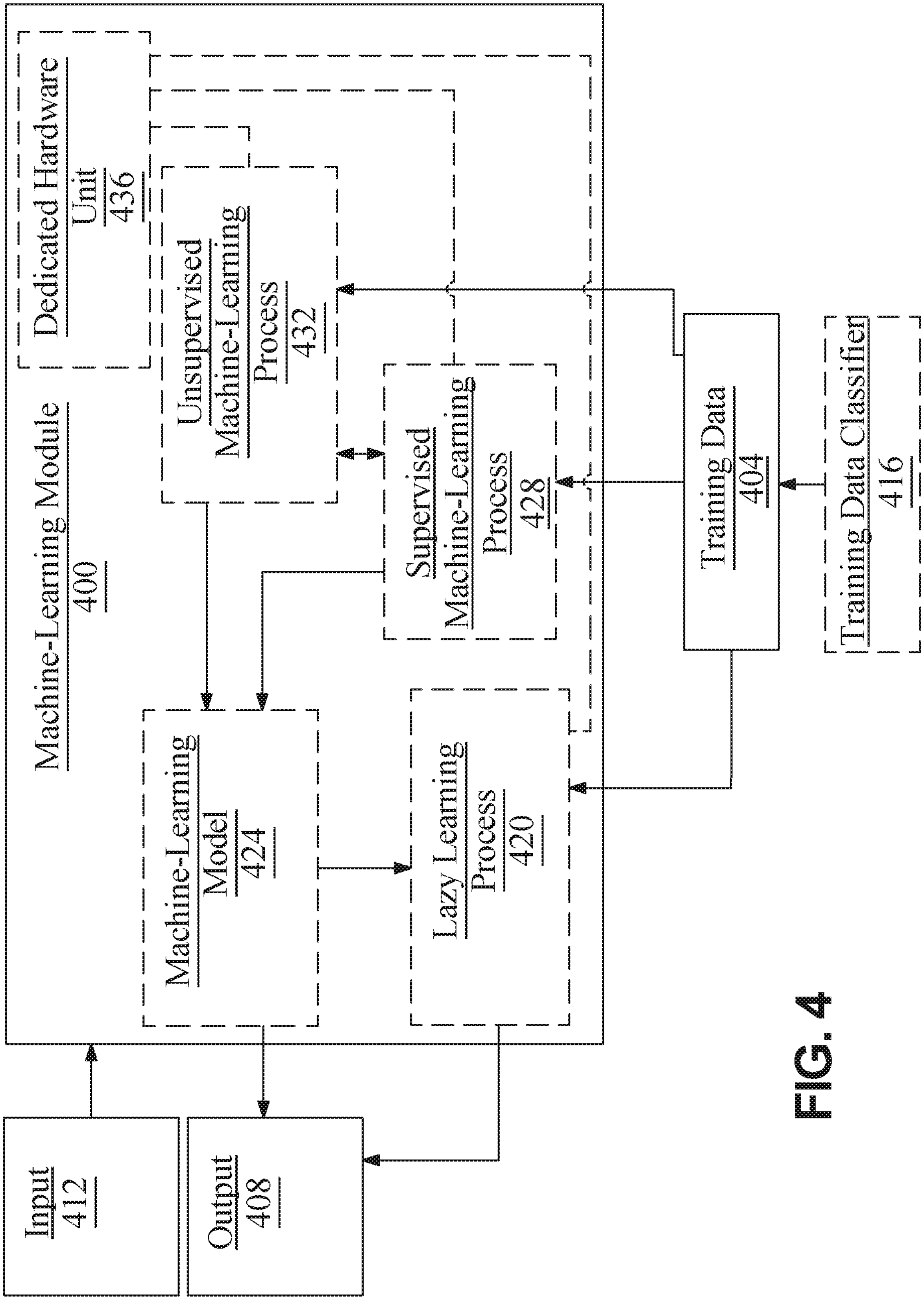
FIG. 4 illustrates a block diagram of an exemplary machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, input data may include data signal, access context, ingestion pathway, interaction data, and the like. As a non-limiting illustrative example, output data may include access context, ingestion pathway, data structure, data objects, and the like.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a process whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to entity cohorts related to entity's demographic such as age, gender, occupation, location, and the like.

Still referring to FIG. 4, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l=\sqrt{\sum_{i=0}^{n}a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the 25th percentile value and the 50th percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include data signal, access context, ingestion pathway, interaction data, and the like as described above as inputs, access context, ingestion pathway, interaction data, data structure, data objects, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including, without limitation, gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation, support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
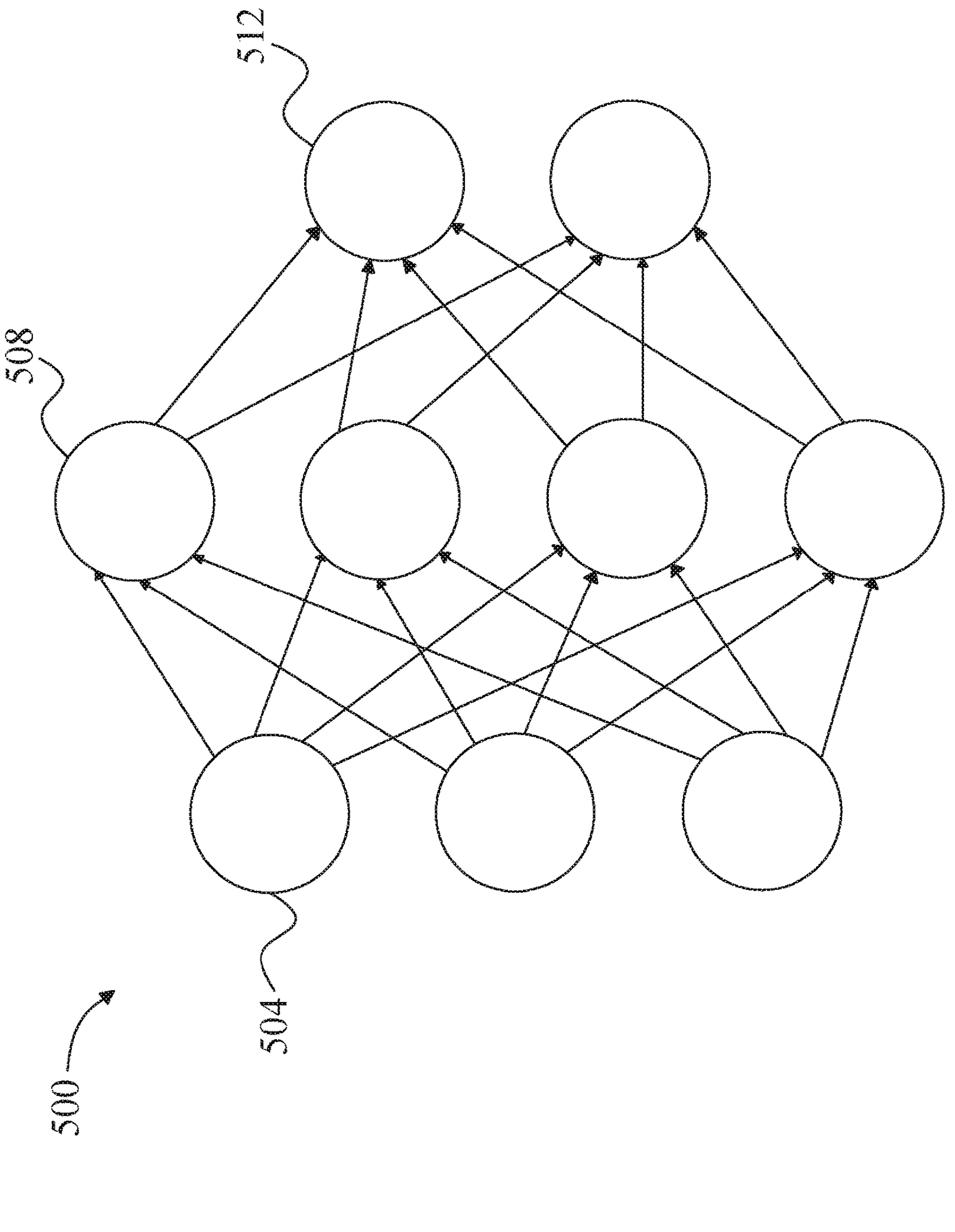
FIG. 5 illustrates a diagram of an exemplary neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
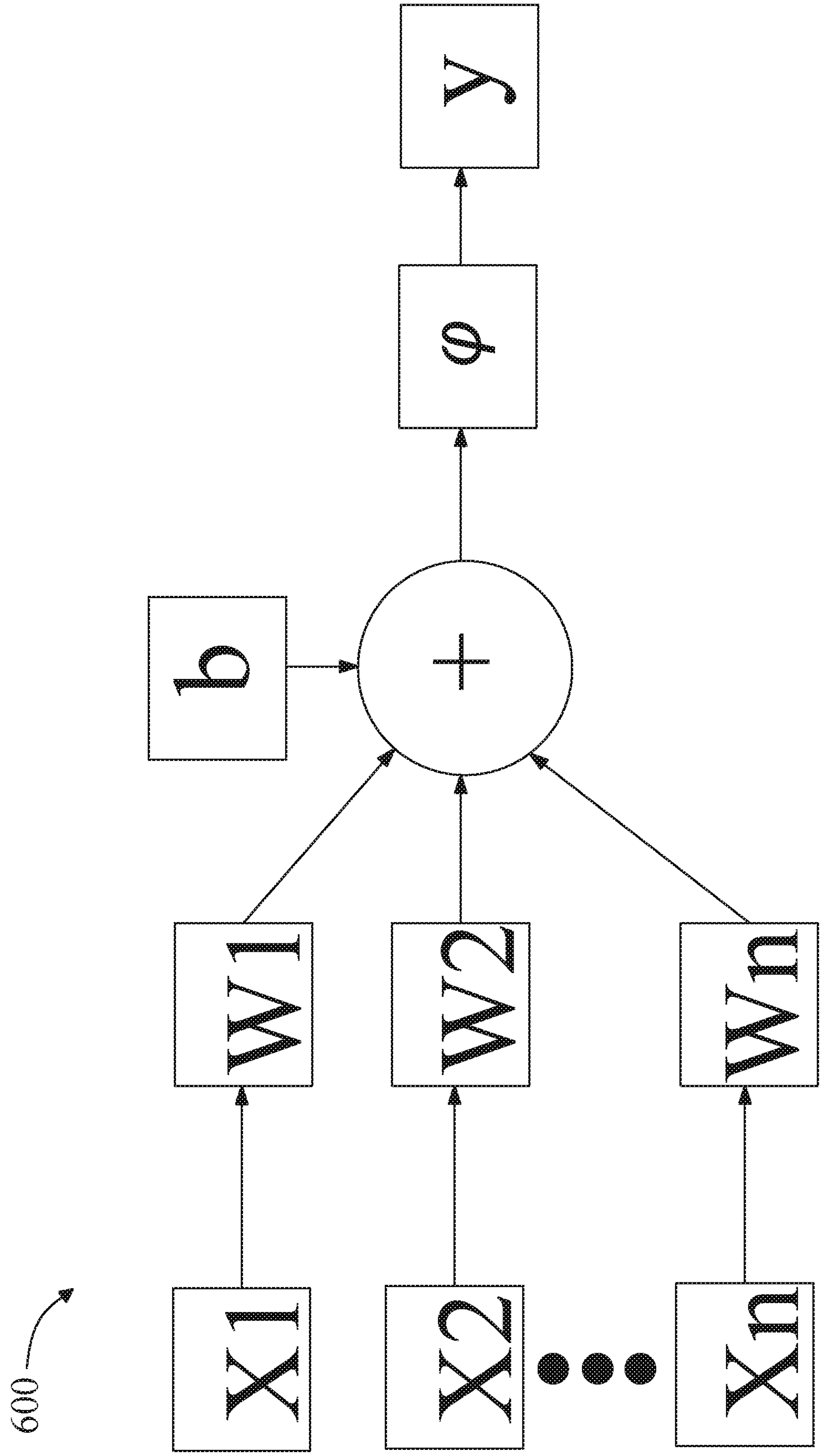
FIG. 6 illustrates a block diagram of an exemplary node in a neural network.

Referring now to FIG. 6, an exemplary embodiment of a node 600 of a neural network is illustrated. A node may include, without limitation, a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as f(x)=max(0,x), a "leaky" and/or "parametric" rectified linear unit function such as f(x)=max (ax,x) for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as f(x)=x*sigmoid(x), a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs xi that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha \frac{dJ}{dw}$$

where $w_{new}$ is the updated weight value, $w_{old}$ is the previous weight value, α is a parameter to set the learning rate, and $$\frac{dJ}{dw}$$

is the partial derivative of with respect to weight w.

Figure 7:
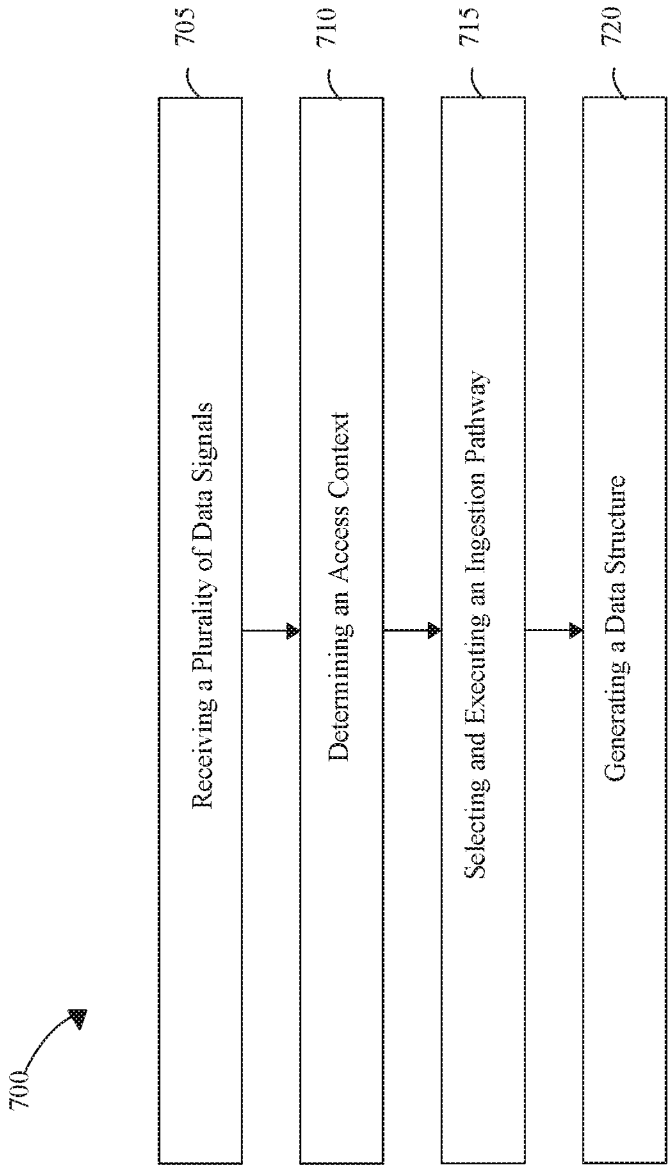
FIG. 7 illustrates a flow diagram of an exemplary method of license-gated, real-time data orchestration and unified representation.

Referring now to FIG. 7, a flow diagram of an exemplary method 700 of license-gated, real-time data orchestration and unified representation. Method 700 includes a step 705 of receiving, using at least a processor, a plurality of data signals from a plurality of operational environments in real time. In some embodiments, the plurality of data signals may include at least one data signal from a system-controlled interface, wherein the at least one data signal may include interaction data. These may be implemented as described and with reference to FIGS. 1-6.

With continued reference to FIG. 7, method 700 contains a step 710 of determining, using at least a processor and at runtime, an access context for each data signal, wherein each access context is associated with one or more permissible data sources and one or more access constraints. In some embodiments, determining the access context may include: generating context training data including labeled data acquisition events indicating compliance with the one or more access constraints; training a context machine-learning model using the context training data; and generating, for each data signal, a context score using the trained context machine-learning model to determine the access context. These may be implemented as described and with reference to FIGS. 1-6.

With continued reference to FIG. 7, method 700 contains a step 715 of selecting and executing, using at least a processor, for each data signal, an ingestion pathway as a function of an access context, wherein executing the ingestion pathway includes establishing a constrained data session with one or more permissible data sources associated with the access context, wherein establishing the constrained data session includes enforcing one or more access constraints during the constrained data session, acquiring, using the constrained data session, source data from the one or more permissible data sources, and blocking acquisition of data from non-permissible data sources. In some embodiments, selecting the ingestion pathway may include selecting the ingestion pathway as a function of the context score. In some embodiments, enforcing the one or more access constraints may include automatically modifying enforcement of the one or more access constraints during the constrained data session as a function of the context score, wherein the modification may include restricting a scope of data acquisition. In some embodiments, the modification further may include terminating the constrained data session. In some embodiments, the one or more access constraints may include timing constraints that permit acquisition of data at a time of entity interaction. In some embodiments, blocking the acquisition of data from the non-permissible data sources may include automatically terminating the constrained data session upon detection of a violation of the one or more access constraints from the one or more permissible data sources. These may be implemented as described and with reference to FIGS. 1-6.

With continued reference to FIG. 7, method 700 contains a step 720 of generating, using at least a processor, a data structure including source data, wherein generating the data structure includes transforming the source data into one or more data objects, and unifying the one or more data objects generated under different access contexts into the data structure. In some embodiments, generating the data structure may include: generating transformation training data based on historical source data; training a transformation machine-learning model using the transformation training data; and transforming the source data into the one or more data objects using the trained transformation machine-learning model. In some embodiments, unifying the one or more data objects may include linking the one or more data objects to one or more data records stored in the memory using an entity identifier. These may be implemented as described and with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
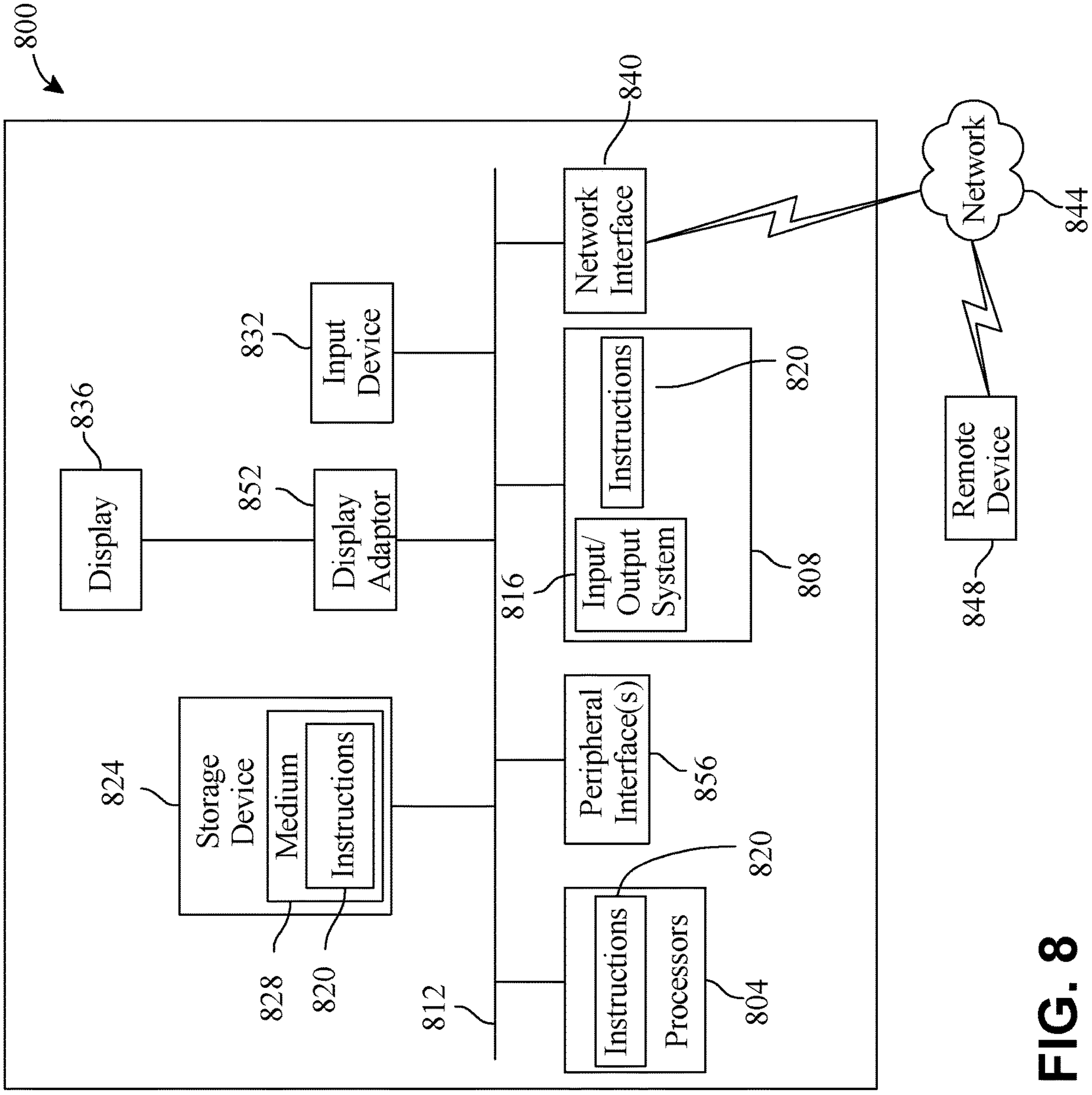
FIG. 8 illustrates a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may include multiple arithmetic, logic, or other units that can work in parallel with each other. Parallel computing between and/or within processors and/or cores may include multithreading processes and/or protocols such as without limitation Tomasulpo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof. Memory 808 may include a primary memory and a secondary memory. "Primary memory," which may be implemented, without limitation as "random access memory"

(RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 800 may include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In some embodiments, storage device 824 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or more remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 820 may reside, completely or partially, within machine-readable medium 828. In another example, software 820 may reside, completely or partially, within processor 804.

Computer system 800 may include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display 836. Examples of a display device include, but are not limited to, a liquid crystal display (LCD), a cathode ray tube (CRT), a plasma display, a light emitting diode (LED) display, and any combinations thereof. Display adapter 852 and display 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

Further referring to FIG. 8, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 8, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 8, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 800, processor 804, and memory 808 may be virtualized; that is, a virtual machine and/or container may interact directly with such computing system 800, processor 804, and/or memory 808, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 804 comprises a plurality of processors and/or processor cores, virtualization may, in some cases, simulate or emulate a single (virtual) processor whose functions are allocated to one or more of the plurality of processors and/or processor cores. In this case, while processor 804 may be said to be virtualized, the processor 804, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU; (2) VMware by Broadcom Inc of Palo Alto, California; (3) VirtualBox by Oracle Corporation headquartered in Austin, Texas; and (4) kernel-based virtual machine (KVM).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for license-gated, real-time data orchestration and unified representation, the apparatus comprising:

at least a processor; and a memory communicatively connected to the at least a processor, wherein the memory contains instructions configuring the at least a processor to:

receive a plurality of data signals from a plurality of operational environments in real time;

determine, at runtime, an access context for each data signal, wherein each access context is associated with one or more permissible data sources and one or more access constraints, wherein the one or more access constraints comprise timing constraints that permit acquisition of data at a time of entity interaction;

select and execute, for each data signal, an ingestion pathway as a function of the access context, wherein executing the ingestion pathway comprises:

establishing a constrained data session with the one or more permissible data sources associated with the access context, wherein establishing the constrained data session comprises enforcing the one or more access constraints during the constrained data session;

acquiring, using the constrained data session, source data from the one or more permissible data sources; and blocking acquisition of data from non-permissible data sources; and generate a data structure comprising the source data, wherein generating the data structure comprises:

transforming the source data into one or more data objects; and unifying the one or more data objects generated under different access contexts into the data structure.

2. The apparatus of claim 1, wherein the plurality of data signals comprises at least one data signal from a system-controlled interface, wherein the at least one data signal comprises interaction data.

3. The apparatus of claim 1, wherein selecting the ingestion pathway comprises selecting the ingestion pathway as a function of the context score.

4. The apparatus of claim 1, wherein enforcing the one or more access constraints comprises automatically modifying enforcement of the one or more access constraints during the constrained data session as a function of the context score, wherein automatically modifying enforcement of the one or more access constraints during the constrained session comprises restricting a scope of data acquisition.

5. The apparatus of claim 4, wherein the modification further comprises terminating the constrained data session.

6. The apparatus of claim 1, wherein blocking the acquisition of data from the non-permissible data sources comprises automatically terminating the constrained data session upon detection of a violation of the one or more access constraints from the one or more permissible data sources.

7. The apparatus of claim 1, wherein generating the data structure comprises:

generating transformation training data based on historical source data;

training a transformation machine-learning model using the transformation training data; and transforming the source data into the one or more data objects using the trained transformation machine-learning model.

8. The apparatus of claim 1, wherein unifying the one or more data objects comprises linking the one or more data objects to one or more data records stored in the memory using an entity identifier.

9. A method of license-gated, real-time data orchestration and unified representation, the method comprising:

receiving, using at least a processor, a plurality of data signals from a plurality of operational environments in real time;

determining, using the at least a processor and at runtime, an access context for each data signal, wherein each access context is associated with one or more permissible data sources and one or more access constraints wherein the one or more access constraints comprise timing constraints that permit acquisition of data at a time of entity interaction;

selecting and executing, using the at least a processor and for each data signal, an ingestion pathway as a function of the access context, wherein executing the ingestion pathway comprises:

establishing a constrained data session with the one or more permissible data sources associated with the access context, wherein establishing the constrained data session comprises enforcing the one or more access constraints during the constrained data session;

acquiring, using the constrained data session, source data from the one or more permissible data sources; and blocking acquisition of data from non-permissible data sources; and generating, using the at least a processor, a data structure comprising the source data, wherein generating the data structure comprises:

transforming the source data into one or more data objects; and unifying the one or more data objects generated under different access contexts into the data structure.

10. The method of claim 9, wherein the plurality of data signals comprises at least one data signal from a system-controlled interface, wherein the at least one data signal comprises interaction data.

11. The method of claim 9, wherein selecting the ingestion pathway comprises selecting the ingestion pathway as a function of the context score.

12. The method of claim 9, wherein enforcing the one or more access constraints comprises automatically modifying enforcement of the one or more access constraints during the constrained data session as a function of the context score, wherein automatically modifying enforcement of the one or more access constraints during the constrained data session comprises restricting a scope of data acquisition.

13. The method of claim 12, wherein the modification further comprises terminating the constrained data session.

14. The method of claim 9, wherein blocking the acquisition of data from the non-permissible data sources comprises automatically terminating the constrained data session upon detection of a violation of the one or more access constraints from the one or more permissible data sources.

15. The method of claim 9, wherein generating the data structure comprises:

generating transformation training data based on historical source data;

training a transformation machine-learning model using the transformation training data; and transforming the source data into the one or more data objects using the trained transformation machine-learning model.

16. The method of claim 9, wherein unifying the one or more data objects comprises linking the one or more data objects to one or more data records stored in a memory communicatively connected to the at least a processor using an entity identifier.

17. An apparatus for license-gated, real-time data orchestration and unified representation, the apparatus comprising:

at least a processor; and a memory communicatively connected to the at least a processor, wherein the memory contains instructions configuring the at least a processor to:

receive a plurality of data signals from a plurality of operational environments in real time;

determine, at runtime, an access context for each data signal, wherein each access context is associated with one or more permissible data sources and one or more access constraints, and determining the access context comprises:

generating context training data comprising labeled data acquisition events indicating compliance with the one or more access constraints;

training a context machine-learning model using the context training data; and generating, for each data signal, a context score using the trained context machine-learning model to determine the access context;

select and execute, for each data signal, an ingestion pathway as a function of the access context, wherein executing the ingestion pathway comprises:

establishing a constrained data session with the one or more permissible data sources associated with the access context, wherein establishing the constrained data session comprises enforcing the one or more access constraints during the constrained data session;

acquiring, using the constrained data session, source data from the one or more permissible data sources; and blocking acquisition of data from non-permissible data sources; and generate a data structure comprising the source data, wherein generating the data structure comprises:

transforming the source data into one or more data objects; and unifying the one or more data objects generated under different access contexts into the data structure.

18. The apparatus of claim 17, wherein the plurality of data signals comprises at least one data signal from a system-controlled interface, wherein the at least one data signal comprises interaction data.

19. The apparatus of claim 17, wherein selecting the ingestion pathway comprises selecting the ingestion pathway as a function of the context score.

20. The apparatus of claim 17, wherein enforcing the one or more access constraints comprises automatically modifying enforcement of the one or more access constraints during the constrained data session as a function of the context score, wherein automatically modifying enforcement of the one or more access constraints during the constrained session comprises restricting a scope of data acquisition.

21. The apparatus of claim 20, wherein the modification further comprises terminating the constrained data session.

22. The apparatus of claim 17, wherein blocking the acquisition of data from the non-permissible data sources comprises automatically terminating the constrained data session upon detection of a violation of the one or more access constraints from the one or more permissible data sources.

23. The apparatus of claim 17, wherein generating the data structure comprises:

generating transformation training data based on historical source data;

training a transformation machine-learning model using the transformation training data; and transforming the source data into the one or more data objects using the trained transformation machine-learning model.

24. The apparatus of claim 17, wherein unifying the one or more data objects comprises linking the one or more data objects to one or more data records stored in the memory using an entity identifier.

25. A method of license-gated, real-time data orchestration and unified representation, the method comprising:

receiving, using at least a processor, a plurality of data signals from a plurality of operational environments in real time;

determining, using the at least a processor and at runtime, an access context for each data signal, wherein each access context is associated with one or more permissible data sources and one or more access constraints, and determining the access context comprises:

generating context training data comprising labeled data acquisition events indicating compliance with the one or more access constraints;

training a context machine-learning model using the context training data; and generating, for each data signal, a context score using the trained context machine-learning model to determine the access context;

selecting and executing, using the at least a processor and for each data signal, an ingestion pathway as a function of the access context, wherein executing the ingestion pathway comprises:

establishing a constrained data session with the one or more permissible data sources associated with the access context, wherein establishing the constrained data session comprises enforcing the one or more access constraints during the constrained data session;

acquiring, using the constrained data session, source data from the one or more permissible data sources; and blocking acquisition of data from non-permissible data sources; and generating, using the at least a processor, a data structure comprising the source data, wherein generating the data structure comprises:

transforming the source data into one or more data objects; and unifying the one or more data objects generated under different access contexts into the data structure.

26. The method of claim 25, wherein the plurality of data signals comprises at least one data signal from a system-controlled interface, wherein the at least one data signal comprises interaction data.

27. The method of claim 26, wherein selecting the ingestion pathway comprises selecting the ingestion pathway as a function of the context score.

28. The method of claim 26, wherein enforcing the one or more access constraints comprises automatically modifying enforcement of the one or more access constraints during the constrained data session as a function of the context score, wherein automatically modifying enforcement of the one or more access constraints during the constrained data session comprises restricting a scope of data acquisition.

29. The method of claim 28, wherein the modification further comprises terminating the constrained data session.

30. The method of claim 25, wherein the one or more access constraints comprise timing constraints that permit acquisition of data at a time of entity interaction.

31. The method of claim 25, wherein blocking the acquisition of data from the non-permissible data sources comprises automatically terminating the constrained data session upon detection of a violation of the one or more access constraints from the one or more permissible data sources.

32. The method of claim 25, wherein generating the data structure comprises:

generating transformation training data based on historical source data;

training a transformation machine-learning model using the transformation training data; and transforming the source data into the one or more data objects using the trained transformation machine-learning model.

33. The method of claim 25, wherein unifying the one or more data objects comprises linking the one or more data objects to one or more data records stored in a memory communicatively connected to the at least a processor using an entity identifier.

* * * * *